(12) United States Patent
Tanaka

(10) Patent No.: US 11,289,739 B2
(45) Date of Patent: *Mar. 29, 2022

(54) COMPOSITION FOR NON-AQUEOUS SECONDARY BATTERY FUNCTIONAL LAYER, NON-AQUEOUS SECONDARY BATTERY FUNCTIONAL LAYER, AND NON-AQUEOUS SECONDARY BATTERY

(71) Applicant: ZEON CORPORATION, Tokyo (JP)

(72) Inventor: Keiichiro Tanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 15/557,226

(22) PCT Filed: Feb. 23, 2016

(86) PCT No.: PCT/JP2016/000951
§ 371 (c)(1),
(2) Date: Sep. 11, 2017

(87) PCT Pub. No.: WO2016/152026
PCT Pub. Date: Sep. 29, 2016

(65) Prior Publication Data
US 2018/0053963 A1    Feb. 22, 2018

(30) Foreign Application Priority Data
Mar. 20, 2015   (JP) .............................. JP2015-058355

(51) Int. Cl.
| H01M 10/058 | (2010.01) |
| H01M 50/409 | (2021.01) |
| H01M 4/13 | (2010.01) |
| H01M 10/0525 | (2010.01) |
| H01M 50/411 | (2021.01) |
| H01M 50/446 | (2021.01) |
| H01M 50/449 | (2021.01) |
| H01M 50/46 | (2021.01) |

(52) U.S. Cl.
CPC ..... H01M 10/058 (2013.01); H01M 10/0525 (2013.01); H01M 50/409 (2021.01); H01M 50/411 (2021.01); H01M 50/446 (2021.01); H01M 50/449 (2021.01); H01M 50/461 (2021.01); H01M 4/13 (2013.01)

(58) Field of Classification Search
CPC .............. H01M 10/058; H01M 2/168; H01M 10/0525; H01M 2/1686; H01M 2/1653; H01M 2/166; H01M 2/16; H01M 4/13
USPC ......................................................... 429/161
See application file for complete search history.

(56) References Cited

U.S. PATENT DOCUMENTS

| 2003/0113626 A1* | 6/2003 | Maeda ................... | H01M 4/621 429/217 |
| 2010/0167124 A1* | 7/2010 | Seo .......................... | H01M 4/13 429/212 |
| 2012/0189897 A1* | 7/2012 | Wakizaka ............. | H01M 2/145 429/144 |
| 2012/0189898 A1 | 7/2012 | Wakizaka et al. | |
| 2013/0344391 A1* | 12/2013 | Yushin ................... | H01M 4/386 429/231.8 |
| 2015/0333308 A1 | 11/2015 | Toyoda et al. | |
| 2016/0141575 A1 | 5/2016 | Sasaki et al. | |
| 2016/0141581 A1 | 5/2016 | Sasaki et al. | |
| 2016/0322630 A1* | 11/2016 | Oyama .................. | H01M 4/366 |
| 2017/0117521 A1 | 4/2017 | Sasaki | |
| 2017/0200932 A1* | 7/2017 | Sasaki ................... | H01M 2/145 |

FOREIGN PATENT DOCUMENTS

| JP | 2012204303 A | 10/2012 |
| WO | 2011040474 A1 | 4/2011 |
| WO | 2013151144 A1 | 10/2013 |
| WO | 2015005145 A1 | 1/2015 |
| WO | 2015005151 A1 | 1/2015 |
| WO | 2015198530 A1 | 12/2015 |
| WO | 2015198534 A1 | 12/2015 |

OTHER PUBLICATIONS

Wypych, George; Handbook of Polymers, ChemTec Publishing, pp. 560-566 (Year: 2016).*
Perry, Dale L.; Handbook of Inorganic Compounds, CRC Press, p. 10 (Year: 2011).*
May 17, 2016, International Search Report issued in the International Patent Application No. PCT/JP2016/000951.
Aug. 3, 2018, the Extended European Search Report issued by the European Patent Office in the corresponding European Patent Application No. 16767938.0.
Sep. 26, 2017, International Preliminary Reporton Patentability issued in the International Patent Application No. PCT/JP2016/000951.
Nov. 8, 2019, Communication pursuant to Article 94(3) EPC issued by the European Patent Office in the corresponding European Patent Application No. 16767938.0.

* cited by examiner

*Primary Examiner* — Christian Roldan
(74) *Attorney, Agent, or Firm* — Kenja IP Law PC

(57) ABSTRACT

The disclosed non-aqueous secondary battery functional layer is formed using a composition that includes non-conductive inorganic particles and organic particles, wherein a difference in density between the non-conductive inorganic particles and the organic particles is 1.5 g/cm³ or more, at least a surface layer portion of the organic particles is made of polymer having a degree of swelling in electrolysis solution of greater than 1 time to 4 times and having a glass-transition temperature of 50° C. or above, and a volume-average particle diameter of the organic particles is 0.80 to 1.50 times a volume-average particle diameter of the non-conductive inorganic particles.

7 Claims, No Drawings

COMPOSITION FOR NON-AQUEOUS SECONDARY BATTERY FUNCTIONAL LAYER, NON-AQUEOUS SECONDARY BATTERY FUNCTIONAL LAYER, AND NON-AQUEOUS SECONDARY BATTERY

TECHNICAL FIELD

The present disclosure relates to compositions for non-aqueous secondary battery functional layer, non-aqueous secondary battery functional layers, and non-aqueous secondary batteries.

BACKGROUND

Non-aqueous secondary batteries, such as lithium ion secondary batteries, are small and light, high in energy density, and capable of repeated cycles of charge and discharge. For such characteristics, secondary batteries are used in a wide variety of applications. A non-aqueous secondary battery generally includes battery members such as a positive electrode, a negative electrode, and a separator for separating the positive electrode and negative electrode from each other to prevent a short-circuit between them. Separators that include a substrate made of, for example, polyolefin material such as polyethylene or polypropylene (hereinafter occasionally referred to as a "separator substrate") and a protection film provided on the substrate for improving heat resistance and puncture resistance have heretofore been used. As the protection layer to be provided on the separator substrate, porous membrane layers formed of non-conductive particles such as organic or inorganic microparticles bound to one another with a binder have been used (see, e.g., PTL 1).

Recently, in efforts to enhance the performance of non-aqueous secondary batteries, studies have been made to achieve further improvements of separators having a protection layer.

Specifically, for example, PTL 2 proposes a separator manufactured by forming on a separator substrate a protection layer containing non-conductive particles and binder, and providing on the protection layer an adhesive layer containing a specific particulate polymer. PTL 2 reports that the use of a separator having such an adhesive layer on the protection layer allows the separator to be well bonded to electrodes and improves battery characteristics of a secondary battery.

CITATION LIST

Patent Literature

PTL 1: WO2011040474A
PTL 2: WO2013151144A

SUMMARY

Technical Problem

However, while the conventional separators having a protection layer and an adhesive layer can exhibit increased adhesion to an electrode compared to those free of an adhesive layer, manufacture of such a separator requires sequential steps of forming a protection layer on a separator substrate and forming an adhesive layer on the protection layer, resulting in the manufacturing process being complex. Hence, the conventional separators have room for improvement in simplifying the manufacturing process to improve productivity.

Further, the adhesive layer of the conventional separators exhibits insufficient adhesion in electrolysis solution. Thus, secondary batteries including such a separator also have room for improvement in enhancing adhesion between the electrode and separator in electrolysis solution while ensuring battery characteristics.

It would therefore be helpful to provide means for advantageously attaining the aforementioned improvements.

Solution to Problem

The inventor made extensive studies to solve the aforementioned problems. The inventor conceived of forming on a separator substrate a single layer capable of exerting both a protection function and an adhesion function at the same time (hereinafter occasionally referred to as a "functional layer"), rather than forming separate protection and adhesive layers, so that the manufacturing process of a separator is simplified for increased productivity. The inventor made further studies and established that forming a functional layer using a specific composition results in a non-aqueous secondary battery functional layer that can well exert the functions of both of protection and adhesive layers (protection function and adhesion function) with a single layer configuration and that can increase adhesion between an electrode and a separator in electrolysis solution while ensuring battery characteristics. The composition comprises organic particles having a specific property and non-conductive inorganic particles having a higher density than the organic particles by at least a specific amount, wherein the organic particles and non-conductive inorganic particles are combined such that the ratio of the volume-average particle diameter of the organic particles to the volume-average particle diameter of the non-conductive inorganic particles falls within a specific range. The inventor thus completed the present disclosure.

That is, the present disclosure is aimed at advantageously solving the aforementioned problem. The disclosed composition for non-aqueous secondary battery functional layer comprises non-conductive inorganic particles and organic particles, wherein the difference in density between the non-conductive inorganic particles and the organic particles (non-conductive inorganic particles' density–organic particles' density) is 1.5 $g/cm^3$ or more, at least a surface layer portion of the organic particles is made of polymer having a degree of swelling in electrolysis solution of greater than 1 time to 4 times and having a glass-transition temperature of 50° C. or above, and the volume-average particle diameter of the organic particles is 0.80 to 1.50 times the volume-average particle diameter of the non-conductive inorganic particles. When such a composition for non-aqueous secondary battery functional layer is used that comprises 1) organic particles at least a surface layer portion of which is made of polymer having a specific property and 2) non-conductive inorganic particles whose density differs by at least 1.5 $g/cm^3$ from that of the organic particles wherein the volume-average particle diameters of the organic particles and non-conductive inorganic particles satisfy a specific relationship, it is possible to form a functional layer that can well exert functions of protecting and adhering battery members using a single layer configuration and that may provide firm adhesion between an electrode and a separator in electrolysis solution while ensure battery characteristics.

In the disclosed composition for non-aqueous secondary battery functional layer, the organic particles preferably have a core-shell structure having a core and a shell that covers at least a part of an outer surface of the core, wherein the shell is made of the polymer described above. The use of organic particles having a core-shell structure whose shell is made of polymer having a specific property makes it possible to provide the functional layer with desired performance by changing the property of the polymer constituting the core, while ensuring battery characteristics and improving adhesion in electrolysis solution.

The disclosed composition for non-aqueous secondary battery functional layer preferably comprises 1 part by mass to 20 parts by mass of the organic particles per 100 parts by mass of the non-conductive inorganic particles. When the content of the organic particles falls within the range, it is possible to allow the non-aqueous secondary battery functional layer to exert superior protection function and adhesion function, as well as to allow a non-aqueous secondary battery to exert superior battery characteristics.

In the disclosed composition for non-aqueous secondary battery functional layer, the non-conductive inorganic particles preferably have a volume-average particle diameter of 0.1 μm to 2 μm. When the volume-average particle diameter of the non-conductive inorganic particles falls within the range, it is possible to allow the non-aqueous secondary battery functional layer to exert superior adhesion function, as well as to allow a non-aqueous secondary battery to exert superior battery characteristics.

In the disclosed composition for non-aqueous secondary battery functional layer, the organic particles preferably have a volume-average particle diameter of 0.5 μm to 3 μm. When the volume-average particle diameter of the organic particles falls within the range, it is possible to allow the non-aqueous secondary battery functional layer to exert superior protection function and adhesion function.

The disclosed composition for non-aqueous secondary battery functional layer preferably further comprises a particulate polymer having a glass-transition temperature of 20° C. or below. When the composition further comprises a particulate polymer having a glass-transition temperature of 20° C. or below, it is possible to enhance the adhesion function of the non-aqueous secondary battery functional layer as well as to increase powder drop resistance of the non-aqueous secondary battery functional layer.

The volume-average particle diameter of the particulate polymer is preferably 0.01 to 0.60 times the volume-average particle diameter of the non-conductive inorganic particles. When the volume-average particle diameter of the particulate polymer falls within the range, it is possible to reduce the occurrence of blocking of battery members provided with the non-aqueous secondary battery functional layer (gluing of the battery members to one another via the functional layers) during storage and transportation, as well as to enhance battery characteristics of a non-aqueous secondary battery.

The present disclosure is aimed at advantageously solving the aforementioned problem, and the disclosed non-aqueous secondary functional layer is formed using any of the compositions for non-aqueous secondary functional layer described above. Such a non-aqueous secondary functional layer formed using the composition for non-aqueous secondary functional layer described above can well exert functions of protecting and adhering battery members using a single layer configuration as well as can provide firm adhesion between an electrode and a separator in electrolysis solution while ensuring battery characteristics.

The present disclosure is aimed at advantageously solving the aforementioned problem, and the disclosed non-aqueous secondary battery comprises the non-aqueous secondary battery functional layer described above. The use of such a non-aqueous secondary battery functional layer allows for high-rate production of non-aqueous secondary batteries that exhibit superior adhesion between the separator and electrode in electrolysis solution and superior battery characteristics.

Advantageous Effect

According to the present disclosure, it is possible to provide a composition for non-aqueous secondary battery functional layer which allows for production of a non-aqueous secondary battery functional layer that can exert protection function and adhesion function with a single layer configuration and that may provide firm adhesion between an electrode and a separator in electrolysis solution while ensuring battery characteristics.

According to the present disclosure, it is also possible to provide a non-aqueous secondary battery functional layer that can exert protection function and adhesion function with a single layer configuration and that can provide firm adhesion between an electrode and a separator in electrolysis solution while ensuring battery characteristics.

According to the present disclosure, it is also possible to provide a non-aqueous secondary battery that comprises the non-aqueous secondary battery functional layer, wherein the non-aqueous secondary battery exhibits superior battery characteristics and can be manufactured at high productivity.

DETAILED DESCRIPTION

Embodiments of the present disclosure will now be described in detail.

The disclosed composition for non-aqueous secondary battery functional layer is used as a material for preparing the disclosed non-aqueous secondary battery functional layer. The disclosed non-aqueous secondary battery functional layer is prepared using the disclosed composition for non-aqueous secondary battery functional layer and constitutes for example a part of a separator. The disclosed non-aqueous secondary battery comprises at least the disclosed non-aqueous secondary battery functional layer.

(Composition for Non-Aqueous Secondary Battery Functional Layer)

The disclosed composition for non-aqueous secondary battery functional layer is a slurry composition containing non-conductive inorganic particles and organic particles, and optionally a particulate polymer and/or other additional component(s), wherein water or the like is used as a dispersion medium. The disclosed composition for non-aqueous secondary battery functional layer comprises, as organic particles, particles having a surface layer portion made of polymer having a degree of swelling in electrolysis solution of greater than 1 time to 4 times and having a glass-transition temperature of 50° C. or above. Further, in the disclosed composition for non-aqueous secondary battery functional layer, the difference in density between the non-conductive inorganic particles and the organic particles (non-conductive inorganic particles' density−organic particles' density) is 1.5 g/cm$^3$ or more, and the volume-average particle diameter of the organic particles is 0.80 to 1.50 times the volume-average particle diameter of the non-conductive inorganic particles.

The functional layer prepared using the disclosed composition for non-aqueous secondary battery functional layer contains organic particles having a surface layer portion made of polymer having a degree of swelling in electrolysis solution of greater than 1 time to 4 times and having a glass-transition temperature of 50° C. or above. It is thus possible to provide firm adhesion between an electrode and a separator in electrolysis solution while ensuring battery characteristics. Also, in the disclosed composition for non-aqueous secondary battery functional layer, the difference in density between the non-conductive inorganic particles and the organic particles (non-conductive inorganic particles' density−organic particles' density) is 1.5 g/cm$^3$ or more. It is thus possible to allow a functional layer formed using the functional layer composition to well exert both 1) a function as a porous protection layer that serves to increase heat resistance and strength of a separator or other battery members (protection function), and 2) a function as an adhesive layer that provides firm adhesion between battery members (e.g., separator and electrode) in electrolysis solution (adhesion function). Further, in the disclosed composition for non-aqueous secondary battery functional layer, the volume-average particle diameter of the organic particles is 0.80 to 1.50 times the volume-average particle diameter of the non-conductive inorganic particles. It is thus possible to sufficiently increase the protection function of the functional layer and its adhesion strength in electrolysis solution.

<Non-Conductive Inorganic Particles>

The non-conductive inorganic particles contained in the composition for non-aqueous secondary battery functional layer are inorganic particles and therefore generally can increase heat resistance and strength of the functional layer. Preferred materials of the non-conductive inorganic particles are those that are present stably in the use environment of non-aqueous secondary batteries and have electrochemical stability, as well as capable of ensuring a specific difference in density between the non-conductive inorganic particles and organic particles described later. Preferred examples of materials of non-conductive inorganic particles chosen from such a perspective include particles of oxides such as aluminum oxide (alumina), hydrated aluminum oxide (boehmite (AlOOH)), gibbsite (Al(OH)$_3$), silicon oxide, magnesium oxide (magnesia), magnesium hydroxide, calcium oxide, titanium oxide (titania), barium titanate (BaTiO$_3$), ZrO, and alumina-silica composite oxide; particles of nitrides such as aluminum nitride and boron nitride; particles of covalent crystals such as silicon and diamond; particles of hardly-soluble ionic crystals such as barium sulfate, calcium fluoride and barium fluoride; and microparticles of clays such as talc and montmorillonite. Of these inorganic materials, preferred are aluminum oxide, boehmite, barium sulfate, and barium titanate. These particles may be subjected to element replacement, surface treatment, solid solution treatment and/or the like where necessary.

The non-conductive inorganic particles may be used alone or in combination.

[Density]

The non-conductive inorganic particles need to have a higher density than organic particles described later, and the difference in density between the non-conductive inorganic particles and the organic particles (non-conductive inorganic particles' density−organic particles' density) needs to be 1.5 g/cm$^3$ or more. The difference in density between the non-conductive inorganic particles and the organic particles is preferably 2.0 g/cm$^3$ or more, more preferably 2.5 g/cm$^3$ or more, and preferably 5.0 g/cm$^3$ or less, and more preferably 4.5 g/cm$^3$ or less. When the difference in density between the non-conductive inorganic particles and the organic particles is less than 1.5 g/cm$^3$, it results in failure to allow the functional layer formed using the composition for non-aqueous secondary battery functional layer to sufficiently exert high levels of adhesion in electrolysis solution. When the difference in density between the non-conductive inorganic particles and the organic particles is 5.0 g/cm$^3$ or less, it is possible to allow the functional layer formed using the composition for non-aqueous secondary battery functional layer to well maintain ion conductivity, so that a non-aqueous secondary battery can exert superior battery characteristics (especially output characteristics).

Although it remains elusive why high adhesion and high ion conductivity cannot be obtained when the difference in density between the non-conductive inorganic particles and the organic particles falls outside the above-described range, the reason is presumed to be as follows. Specifically, a functional layer formed using the composition for non-aqueous secondary battery functional layer containing non-conductive inorganic particles and organic particles exerts a protection function derived mainly from the non-conductive inorganic particles, and high adhesion in electrolysis solution derived mainly from the organic particles. Hence, in order for the functional layer to exert high adhesion, it is preferred that the organic particles are moderately localized on the front side of the functional layer by, for example, migration upon formation of the functional layer, rather than being uniformly present throughout the functional layer while mixed with the non-conductive inorganic particles. Thus, if the difference in density between the non-conductive inorganic particles and organic particles is too small, during formation of a functional layer, the non-conductive inorganic particles and the organic particles do not separate from each other (i.e., the organic particles are not localized on the front side of the functional layer) and this would result in failure to sufficiently provide high adhesion derived from the organic particles. On the other hand, if the difference in density between the non-conductive inorganic particles and the organic particles is too large, the non-conductive inorganic particles and the organic particles are excessively localized inside the functional layer and this would result in failure to ensure space among the non-conductive inorganic particles excessively localized on the rear side of the functional layer to cause reductions in ion conductivity.

The non-conductive inorganic particles may have any level of density so long as it is higher than the density of organic particles described later and the difference in density between the non-conductive inorganic particles and the organic particles is 1.5 g/cm$^3$ or more. The density of the non-conductive inorganic particles is preferably 3.0 g/cm$^3$ or more, and preferably 7.0 g/cm$^3$ or less, more preferably 6.5 g/cm$^3$ or less. If the density of the non-conductive inorganic particles is too low, there is a concern that the non-conductive inorganic particles and the organic particles do not sufficiently separate from each other in the functional layer and thus sufficient adhesion cannot be attained. On the other hand, if the density of the non-conductive inorganic particles is too high, there is a concern that the functional layer exhibits poor ion conductivity due to the presence of the non-conductive inorganic particles excessively localized inside the functional layer.

The "density of non-conductive inorganic particles" herein refers to a true density of non-conductive inorganic particles as measured by the gas displacement method.

[Volume-Average Particle Diameter]

The volume-average particle diameter (D50) of the non-conductive inorganic particles needs to satisfy a specific relationship with the volume-average particle diameter (D50) of organic particles later described. Specifically, the volume-average particle diameter of the non-conductive inorganic particles needs to be such that the volume-average particle diameter of organic particles described later is 0.80 to 1.50 times the volume-average particle diameter of the non-conductive inorganic particles. The ratio of the volume-average particle diameter of the organic particles to the volume-average particle diameter of the non-conductive inorganic particles (organic particles' volume-average particle diameter/non-conductive inorganic particles' volume-average particle diameter) is preferably 0.90 or more, more preferably 1.00 or more, and preferably 1.40 or less, more preferably 1.30 or less. If the ratio of the volume-average particle diameter of the organic particles to the volume-average particle diameter of the non-conductive inorganic particles is less than 0.80, the functional layer formed using the composition for non-aqueous secondary battery functional layer cannot exert high adhesion in electrolysis solution sufficiently. On the other hand, if the ratio of the volume-average particle diameter of the organic particles to the volume-average particle diameter of the non-conductive inorganic particles exceeds 1.50, the protection function of the functional layer formed using the composition for non-aqueous secondary battery functional layer decreases, resulting in failure to sufficiently increase heat resistance (especially heat shrinkage resistance) of a separator or other battery members, as well as in reduced contact area of the organic particles and therefore the functional layer cannot exert sufficient adhesion in electrolysis solution.

Although it remains elusive why high adhesion and desired protection function cannot be obtained when the ratio of the volume-average particle diameter of the organic particles to the volume-average particle diameter of the non-conductive inorganic particles falls outside the range described above, the reason is presumed to be as follows. Specifically, if the volume-average particle diameter of the organic particles is too small relative to the volume-average particle diameter of the non-conductive inorganic particles, the organic particles inside the functional layer which were unable to be localized on the front side of the functional layer are held among the non-conductive inorganic particles and cannot contribute to adhesion of the surface of the functional layer, so that high adhesion strength derived from the organic particles would not be sufficiently exerted in electrolysis solution. On the other hand, if the volume-average particle diameter of the organic particles is too large relative to the volume-average particle diameter of the non-conductive inorganic particles, the protection function would decrease because the space between the particles in the functional layer increases resulting in the functional layer being susceptible to shrinkage (i.e., heat shrinkage resistance decreases).

The volume-average particle diameter of the non-conductive inorganic particles is preferably 0.1 μm or more, more preferably 0.2 μm or more, even more preferably 0.3 μm or more, and preferably 2.0 μm or less, more preferably 1.75 μm or less, even more preferably 1.1 μm or less. When the volume-average particle diameter of the non-conductive inorganic particles is set to 0.1 μm or more, it is possible to prevent reductions in the ion conductivity of the functional layer due to non-conductive inorganic particles densely packed within the functional layer and therefore improve battery characteristics (especially output characteristics) of a non-aqueous secondary battery. When the volume-average particle diameter of the non-conductive inorganic particles is set to 2.0 μm or less, it is possible to allow the functional layer to exert a good adhesion function. Further, the use of non-conductive inorganic particles having the above-described volume-average particle diameter makes it possible to provide a functional layer that exerts a superior protection function even when the thickness of the functional layer is small and therefore increase the capacity of the battery.

The "volume-average particle diameter of non-conductive inorganic particles" herein can be measured in compliance with JIS Z8825 and represents a particle diameter where the cumulative volume from the fine side amounts to 50% of the entire volume in a particle size distribution (volume basis) measured by laser diffraction.

<Organic Particles>

The organic particles contained in the composition for non-aqueous secondary battery functional layer are particles that serve in the functional layer as an adhesive that firmly bonds together battery members of a non-aqueous secondary battery, e.g., a separator and an electrode. At least a surface layer portion of the organic particles is made of polymer having a degree of swelling in electrolysis solution of greater than 1 time to 4 times and having a glass-transition temperature of 50° C. or above Organic particles having the structure and properties described above exert superior adhesion in electrolysis solution and can well improve battery characteristics of a non-aqueous secondary battery provided with the functional layer. There are cases wherein battery members such as a separator used for the manufacture of a non-aqueous secondary battery are stored and transported in a spirally wound form. Battery members having the non-aqueous secondary battery functional layer are less likely to undergo blocking (gluing of battery members to one another via functional layers) even when spirally wound and therefore are superior in handleability.

Although it remains elusive why the organic particles result in a superior effect such as that described above, the reason is presumed to be as follows.

Specifically, the polymer constituting at least the surface layer portion of the organic particle swells in contact with electrolysis solution. At this time, due for example to activation of the functional groups of the swollen polymer of the surface layer portion followed by chemical or electrical interactions with functional groups present on the surface of a battery member (e.g., separator substrate to be provided with a functional layer, or electrode to be bonded with a separator having a functional layer), the organic particles can be firmly bound to the battery member. Thus, a functional layer containing such organic particles would enable battery members (e.g., separator and electrode) to be firmly bound to one another in electrolysis solution.

Further, since the use of a functional layer containing the organic particles can provide firm adhesion between battery members in electrolysis solution as described above, in a secondary battery including such a functional layer, space is not easily formed between the battery members (e.g., between separator and electrode) bonded together with the functional layer. Thus, in a secondary battery including a functional containing the organic particles, the distance between the positive and negative electrodes does not easily increase, the internal resistance of the secondary battery can be lowered, and the reaction field of electrochemical reactions in the electrode does not easily become non-uniform. Further, in the secondary battery, space is not easily formed between the separator and electrode even after repeated cycles of charge and discharge, and thus the battery capacity does not easily decrease. It is assumed that this achieves superior bulging resistance and superior battery characteristics such as cycle characteristics.

Further, when not swollen in electrolysis solution, the polymer constituting the surface layer portion of the organic particle does not generally exhibit great adhesion but does so only after swollen in electrolysis solution. For this reason, the organic particles do not generally exert great adhesion when they are not swollen in electrolysis solution. The functional layer containing the organic particles therefore does not exert great adhesion when not swollen in electrolysis solution, and a battery member provided with such a functional layer would not easily experience blocking even when stacked. It is not that the organic particles do not exert adhesion at all as long as they do not swell in contact with electrolysis solution; they may exert adhesion when, for example, heated to a given temperature or higher (e.g., 50° C. or above).

[Degree of Swelling in Electrolysis Solution of Polymer]

The polymer constituting at least the surface layer portion of the organic particles needs to have a degree of swelling in electrolysis solution of greater than 1 time, preferably 1.1 times or more, more preferably 1.2 times or more, and needs to have a degree of swelling in electrolysis solution of 4 times or less, preferably 3.5 times or less, more preferably 3 times or less. By setting the degree of swelling in electrolysis solution of the polymer constituting the surface layer portion of the organic particles to fall within the above-described range, it is possible to increase adhesion in electrolysis solution of the functional layer. Accordingly, it is possible to reduce internal resistance of a secondary battery and therefore to well maintain its battery characteristics. By setting the degree of swelling in electrolysis solution of the polymer constituting the surface layer portion of the organic particles to be at least greater than 1 time, it is possible to improve output characteristics of a secondary battery. By setting the degree of swelling in electrolysis solution to 4 times or less, it is possible to increase adhesion of the functional layer.

The electrolysis solution used for the measurement of the degree of swelling in electrolysis solution of the polymer constituting the surface layer portion of the organic particles can be a solution which is obtained by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume), SP value: 12.7 $(cal/cm^3)^{1/2}$) at a concentration of 1 mol/L.

The degree of swelling in electrolysis solution of the polymer constituting the surface layer portion of the organic particles can be measured in a manner as specifically described below.

First, a polymer constituting the surface layer portion of the organic particles is provided. For example, using a monomer composition used for forming the surface layer portion of the organic particles upon preparation of the organic particles, a polymer is prepared under polymerization conditions similar to those for the formation of the surface layer portion. A film is fabricated using the polymer thus prepared. For example, when the polymer is solid, it is dried at 25° C. for 48 hours and then shaped into a 0.5 mm thick film. Alternatively, when the polymer is solution or dispersion liquid such as latex, the solution or dispersion liquid is placed into a polytetrafluoroethylene petri dish and dried at 25° C. for 48 hours to prepare a 0.5 mm thick film.

Next, the film prepared as described above is cut into a 1 cm×1 cm square sheet to provide a test specimen. The weight (W0) of the test specimen is measured. Further, the test specimen is immersed into the electrolysis solution described above at 60° C. for 72 hours and taken out from the electrolysis solution. The electrolysis solution on the surface of the test specimen is wiped off, and the weight (W1) of the test specimen after immersion is measured.

Using weights W0 and W1, the degree of swelling S (fold) is calculated using the equation S=W1/W0.

An exemplary method of adjusting the degree of swelling in electrolysis solution of the polymer constituting the surface layer portion of the organic particles is to properly select the types and amounts of monomers used to prepare the polymer in consideration of the SP value of the electrolysis solution. In general, when a polymer has an SP value close to that of electrolysis solution, the polymer tends to swell in the electrolysis solution. On the other hand, when a polymer has an SP value far from that of electrolysis solution, the polymer tends to be less likely to swell in the electrolysis solution.

[Glass-Transition Temperature of Polymer]

The polymer constituting at least the surface layer portion of the organic particles needs to have a glass-transition temperature of 50° C. or above, preferably 60° C. or above, more preferably 70° C. or above, and preferably 150° C. or below, more preferably 120° C. or below. By setting the glass-transition temperature of the polymer constituting the surface layer portion of the organic particles to 50° C. or above, it is possible to reduce the occurrence of blocking due to the functional layer. By setting the glass-transition temperature to 150° C. or below, it is possible to limit reductions in battery characteristics such as output characteristics by preventing the polymer constituting the surface layer portion of the organic particles from having film form which causes increases in internal resistance of secondary battery, while increasing adhesion in electrolysis solution of the functional layer.

The glass-transition temperature of the polymer constituting the surface layer portion of the organic particles can be measured in compliance with JIS K7121.

The glass-transition temperature of the polymer constituting the surface layer portion of the organic particles can be adjusted by any suitable means, e.g., by changing the composition and/or molecular weight of the polymer.

[Polymer Composition]

The monomers used to prepare the polymer constituting at least the surface layer portion of the organic particles may be appropriately selected from those that provide a polymer whose degree of swelling in electrolysis solution and glass-transition temperature described above fall within the ranges described above. Examples of such monomers include vinyl chloride-based monomers such as vinyl chloride and vinylidene chloride; vinyl acetate-based monomers such as vinyl acetate; aromatic vinyl monomers such as styrene, α-methylstyrene, styrene sulfonic acid, butoxystyrene, and vinylnaphthalene; vinylamine-based monomers such as vinylamine; vinylamide-based monomers such as N-vinylformamide and N-vinylacetamide; acid group-containing monomers such as carboxyl group-containing monomers, sulfonate group-containing monomers, phosphate group-containing monomers, and hydroxyl group-containing monomers; (meth)acrylic acid derivatives such as 2-hydroxyethyl methacrylate; (meth)acrylic acid ester monomers such as methyl acrylate, ethyl acrylate, butyl acrylate, methyl methacrylate, ethyl methacrylate, butyl methacrylate, and 2-ethylhexyl acrylate; (meth)acrylamide monomers such as acrylamide and methacrylamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; maleimide derivatives such as phenylmaleimide; and diene-based monomers such as 1,3-butadiene and isoprene. These monomers may be used alone or in combination at any ratio.

As used herein, "(meth)acryl" refers to acryl and/or methacryl, "(meth)acrylonitrile" refers to acrylonitrile and/or methacrylonitrile," and "(meth)acrylate" refers to acrylate and/or methacrylate.

Of these monomers, aromatic vinyl monomers are preferred as monomers used for the preparation of the polymer constituting the surface layer portion of the organic particles. Specifically, the polymer constituting the surface layer portion of the organic particles preferably contains an aromatic vinyl monomer unit. Among aromatic vinyl monomers, styrene and styrene derivatives such as styrene sulfonic acid are preferred. The use of aromatic vinyl monomers not only make it easy to control the degree of swelling in electrolysis solution and glass-transition temperature of the polymer, but can further increase adhesion of the functional layer.

The phrase "the polymer contains a monomer unit" herein means that "a structural unit derived from that monomer is contained in the polymer obtained using that monomer."

The percentage of the aromatic vinyl monomer unit in the polymer constituting the surface layer portion of the organic particles is preferably 20% by mass or more, more preferably 40% by mass or more, even more preferably 50% by mass or more, yet more preferably 60% by mass or more, particularly preferably 80% by mass or more, and preferably 100% by mass or less, more preferably 99.5% by mass or less, even more preferably 99% by mass or less. By setting the percentage of the aromatic vinyl monomer unit to fall within the above-described range, the degree of swelling in electrolysis solution and glass-transition temperature of the polymer can be easily set to fall within the above-described ranges. Further, it is possible to further increase adhesion in electrolysis solution of the functional layer.

The polymer constituting the surface layer portion of the organic particles may contain an acid group-containing monomer unit in addition to the aromatic vinyl monomer unit. Examples of acid group-containing monomers that may form the acid group-containing monomer unit include monomers having an acid group, such as carboxyl group-containing monomers, sulfonate group-containing monomers, phosphate group-containing monomers, and hydroxyl group-containing monomers.

Examples of the carboxylic acid group-containing monomers include monocarboxylic acids and dicarboxylic acids. Examples of the monocarboxylic acids include acrylic acid, methacrylic acid, and crotonic acid. Examples of the dicarboxylic acids include maleic acid, fumaric acid, and itaconic acid.

Examples of the sulfonate group-containing monomers include vinyl sulfonic acid, methylvinyl sulfonic acid, (meth)allyl sulfonic acid, (meth)acrylic acid-2-ethyl sulfonate, 2-acrylamide-2-methyl propane sulfonic acid, and 3-allyloxy-2-hydroxypropane sulfonic acid.

Examples of the phosphate group-containing monomers include 2-(meth)acryloyloxyethyl phosphate, methyl-2-(meth)acryloyloxyethyl phosphate, and ethyl-(meth)acryloyloxyethyl phosphate.

Examples of the hydroxyl group-containing monomers include 2-hydroxyethyl acrylate, 2-hydroxypropyl acrylate, 2-hydroxyethyl methacrylate, and 2-hydroxypropyl methacrylate.

Of these acid group-containing monomers, carboxylic acid group-containing monomers are preferred, with monocarboxylic acids being more preferred, and (meth)acrylic acid being even more preferred.

These acid group-containing monomers may be used alone or in combination at any ratio.

The percentage of the acid group-containing monomer unit in the polymer constituting the surface layer portion of the organic particles is preferably 0.1% by mass or more, more preferably 1% by mass or more, even more preferably 3% by mass or more, and preferably 20% by mass or less, more preferably 10% by mass or less, even more preferably 7% by mass or less. By setting the percentage of the acid group-containing monomer unit to fall within the above-described range, it is possible to allow the functional layer to exert good adhesion.

The polymer constituting the surface layer portion of the organic particles may contain a cross-linkable monomer unit in addition to the monomer units described above. A cross-linkable monomer refers to a monomer that may form a cross-linked structure during or after polymerization by heating or by irradiation with energy beams. When the polymer contains a cross-linkable monomer unit, the degree of swelling of the polymer can be easily set to fall within the above-described range.

Examples of cross-linkable monomers that may form a cross-linkable monomer unit include multi-functional monomers having two or more polymerizable reactive groups in the molecule. Examples of such multi-functional monomers include divinyl compounds such as divinyl benzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylol propane trimethacrylate, and trimethylol propane triacrylate; and epoxy group-containing ethylenically unsaturated monomers such as allyl glycidyl ether, and glycidyl methacrylate. These cross-linkable monomers may be used alone or in combination at any ratio.

The percentage of the cross-linkable monomer unit in the polymer constituting the surface layer portion of the organic particles is preferably 0.1% by mass or more, more preferably 0.2% by mass or more, even more preferably 0.5% by mass or more, and preferably 5% by mass or less, more preferably 4% by mass or less, even more preferably 3% by mass or less.

[Structure of Organic Particles]

Non-limiting examples of organic particles that comprise a surface layer portion made of polymer having the degree of swelling in electrolysis solution and glass-transition temperature include the following particles (1) to (4):

(1) solid particles made only of polymer having a degree of swelling in electrolysis solution of greater than 1 time to 4 times and a glass-transition temperature of 50° C. or above;

(2) hollow particles made only of polymer having a degree of swelling in electrolysis solution of greater than 1 time to 4 times and a glass-transition temperature of 50° C. or above;

(3) core-shell particles having a core-shell structure that comprises a core and a shell that covers at least a part of an outer surface of the core, where the shell is made of polymer having a degree of swelling in electrolysis solution of greater than 1 time to 4 times and a glass-transition temperature of 50° C. or above; and (4) porous particles made only of polymer having a degree of swelling in electrolysis solution of greater than 1 time to 4 times and a glass-transition temperature of 50° C. or above.

The solid particles (1) can be produced any suitable means, e.g., by emulsion polymerization, suspension polymerization, or solution polymerization.

The hollow particles (2) can be produced any suitable means, e.g., after preparing particles having a core-shell structure, the polymers are immersed into solvent that dissolves the core polymer but does not dissolve the shell polymer so as to dissolve the core polymer.

The core-shell particles (3) can be prepared by any suitable means, e.g., by stepwise polymerization of monomers for core and shell polymers with the ratios of these monomers being changed over time. Specifically, the organic particles can be prepared by continuous, multi-stage emulsion polymerization or multi-stage suspension polymerization wherein, e.g., a polymer produced in a previous stage is sequentially covered with a polymer produced in a later stage.

The porous particles (4) can be prepared by any suitable means, e.g., by preparing polymer particles in which a soluble polymer which is soluble in a specific solvent is dispersed in an insoluble polymer which is insoluble in the specific solvent, and immersing the polymer particles in the specific solvent to dissolve the soluble polymer.

Among the foregoing particles, as organic particles it is preferred to employ the core-shell particles (3), more preferably core-shell particles wherein the shell made of polymer having the degree of swelling in electrolysis solution and glass-transition temperature described above partially covers an outer surface of the core, even more preferably core-shell particles wherein the shell made of polymer having the degree of swelling in electrolysis solution and glass-transition temperature described above partially covers an outer surface of the core and the core is made of polymer having a degree of swelling in electrolysis solution of 5 times to 30 times. The use of organic particles having the core-shell structure makes it possible to provide the functional layer with desired performance by changing the property of the core polymer, while ensuring battery characteristics and increased adhesion in electrolysis solution which are attained by the shell made of polymer having the degree of swelling in electrolysis solution and glass-transition temperature described above. The use of core-shell particles wherein the shell partially covers an outer surface of the core provides better contact between the core and electrolysis solution compared to core-shell particles wherein the shell covers the entire outer surface of the core, making it possible for the organic particles to easily exert a function derived from the core in electrolysis solution. Further, the use of core-shell particles wherein the shell partially covers an outer surface of the core and the core is made of polymer having a degree of swelling in electrolysis solution of 5 times to 30 times causes the core polymer to greatly swell upon contact with electrolysis solution, so that ions easily pass through the core in the electrolysis solution and therefore the organic particles can exert high ion conductivity. It is thus also possible to limit rises in resistance by the functional layer to limit reductions in battery characteristics such as output characteristics.

Even when the core outer surface of core-shell particles used as organic particles seems to be completely covered by a shell by its appearance, the shell is equated to a shell that partially covers the core outer surface in cases where the shell has a pore that communicates between inside and outside of the shell. Accordingly, the core-shell particles wherein the shell made of polymer having the degree of swelling in electrolysis solution and glass-transition temperature described above partially covers an outer surface of the core encompass, for example, such core-shell particles with a shell having a fine pore that communicates from the shell outer surface (i.e., peripheral surface of the organic particle) to the core outer surface.

[[Degree of Swelling in Electrolysis Solution of Core Polymer]]

The core polymer for the core-shell particles which may be suitably used as organic particles preferably has a degree of swelling in electrolysis solution of 5 times or more, more preferably 10 times or more, even more preferably 15 times or more, and preferably 30 times or less, more preferably 28 times or less, even more preferably 25 times or less. By setting the degree of swelling in electrolysis solution of the core polymer to 5 times or more, it is possible to allow the organic particles to exert high ion conductivity to improve battery characteristics such as output characteristics. By setting the degree of swelling in electrolysis solution of the core polymer to 30 times or less, it is possible to increase adhesion in electrolysis solution of the functional layer to improve battery characteristics such as cycle characteristics.

The electrolysis solution used for the measurement of the degree of swelling in electrolysis solution of the core polymer is the same as the electrolysis solution described above used to measure the degree of swelling in electrolysis solution of the polymer constituting the surface layer portion of the organic particles.

The degree of swelling in electrolysis solution of the core polymer can be measured in a manner as specifically described below.

First, a polymer for the core of the core-shell particles is provided. For example, using a monomer composition used for forming the core of the core-shell particles, a polymer is prepared under the same polymerization conditions as those used for the formation of the core.

Thereafter, using the same method as that used for the measurement of the degree of swelling of the polymer constituting the surface layer portion of the organic particles, a film is prepared from the core polymer, a test specimen is cut from the film, and the test specimen is measured for degree of swelling in electrolysis solution (S).

An exemplary method of adjusting the degree of swelling in electrolysis solution of the core polymer is to properly select the types and amounts of monomers used to prepare the core polymer while considering the SP value of the electrolysis solution.

[[Glass-Transition Temperature of Core]]

The core polymer of the core-shell particles which may be suitably used as organic particles preferably has a glass-transition temperature of 10° C. or above, more preferably 20° C. or above, and preferably 110° C. or below, more preferably 100° C. or below. By setting the glass-transition temperature of the core polymer to 10° C. or above, it is possible to reduce the occurrence of blocking caused by the functional layer containing organic particles formed of the core-shell particles. By setting the glass-transition temperature of the core polymer to 110° C. or below, it is possible to further increase adhesion in electrolysis solution of the functional layer containing organic particles formed of the core-shell particles to improve battery characteristics such as cycle characteristics.

The glass-transition temperature of the core polymer can be measured in compliance with JIS K7121.

The glass-transition temperature of the core polymer can be adjusted by any suitable means, e.g., by changing the composition and/or molecular weight of the polymer.

[[Composition of Core Polymer]]

The monomers used to prepare the core polymer of the core-shell particles which may be suitably used as organic particles may be appropriately selected from those that provide a polymer whose degree of swelling in electrolysis solution and glass-transition temperature described above fall within the ranges described above. Examples of such monomers include those exemplified above as monomers which may be used to produce the polymer constituting the surface layer portion of the organic particles (polymer constituting the shell of the core-shell particles). These monomers may be used alone or in combination at any ratio.

In particular, preferred for the preparation of the core polymer are (meth)acrylic acid ester monomers and (meth)acrylonitrile monomers, with (meth)acrylic acid ester monomers being more preferred. Specifically, the core polymer preferably contains a (meth)acrylic acid ester monomer unit or a (meth)acrylonitrile monomer unit, and more preferably contains a (meth)acrylic acid ester monomer unit. This not only makes it easy to control the degree of swelling in electrolysis solution of the core polymer, but can further increase ion diffusivity of the functional layer containing organic particles formed of the core-shell particles.

The total percentage of the (meth)acrylic acid ester monomer unit and the (meth)acrylonitrile monomer unit in the core polymer is preferably 50% by mass or more, more preferably 60% by mass or more, even more preferably 70% by mass or more, and preferably 100% by mass or less, more preferably 99% by mass or less, even more preferably 95% by mass or less. By setting the total percentage of the (meth)acrylic acid ester monomer unit and the (meth)acrylonitrile monomer unit to fall within the above-described range, the degree of swelling in electrolysis solution of core polymer can be easily set to fall within the above-described range. Further, it is possible to increase ion diffusivity of the functional layer, and further to improve low-temperature output characteristic of a secondary battery.

The core polymer may contain an acid group-containing monomer unit. Examples of acid group-containing monomers include those exemplified above as acid-group containing monomers which may be used to prepare the polymer constituting the surface layer portion of the organic particles.

Of these acid group-containing monomers, carboxylic acid group-containing monomers are preferred, with monocarboxylic acids being more preferred, and (meth)acrylic acid being even more preferred.

These acid group-containing monomers may be used alone or in combination at any ratio.

The percentage of the acid group-containing monomer unit in the core polymer is preferably 0.1% by mass or more, more preferably 1% by mass or more, even more preferably 3% by mass or more, and preferably 20% by mass or less, more preferably 10% by mass or less, and even more preferably 7% by mass or less. By setting the percentage of the acid group-containing monomer unit to fall within the above-described range, it is possible to increase dispersibility of the core polymer during preparation of core-shell particles, enabling a shell to be easily formed on the core outer surface.

The core polymer preferably contains a cross-linkable monomer unit in addition to the monomer units described above. Examples of cross-linkable monomers include those exemplified above as cross-linkable monomers which may be used to prepare the polymer constituting the surface layer portion of the organic particles. From the perspective of easily controlling the degree of swelling in electrolysis solution of the core polymer, as such cross-linkable monomers, dimethacrylic acid ester compounds and epoxy group-containing ethylenically unsaturated monomers are preferred, with dimethacrylic acid ester compounds being more preferred. These cross-linkable monomers may be used alone or in combination at any ratio.

In general, the degree of swelling in electrolysis solution of a polymer tends to decrease with increasing percentage of a cross-linkable monomer unit in that polymer. Accordingly, it is preferable to determine the percentage of a cross-linkable monomer unit in the core polymer in consideration of the types and amounts of monomers used. The specific percentage of the cross-linkable monomer unit in the core polymer is preferably 0.1% by mass or more, more preferably 0.2% by mass or more, even more preferably 0.5% by mass or more, and preferably 5% by mass or less, more preferably 4% by mass or less, even more preferably 3% by mass or less. By setting the percentage of the cross-linkable monomer unit to 0.1% by mass or more, it is possible to increase adhesion of the functional layer. By setting the percentage of the cross-linkable monomer unit to 5% by mass or less, it is possible to improve cycle characteristics of a non-aqueous secondary battery.

[[Structure of Core-Shell Particle]]

For the core-shell particles described above which may be suitably used as organic particles, the average ratio of shell coverage on the core outer surface (ratio of coverage) is preferably 10% or more, more preferably 40% or more, even more preferably 55% or more, and preferably 99% or less, more preferably 95% or less, even more preferably 85% or less. By setting the average ratio of shell coverage on the core outer surface to fall within the above-described range, it is possible to establish a good balance between ion diffusivity and adhesion of the functional layer.

The average ratio of shell coverage on the core outer surface may be measured by the observation of the cross-sectional structures of core-shell particles. Specifically, measurements may be made by the method described below.

First, core-shell particles are fully dispersed in room temperature-curable epoxy resin and then embedded to form a block piece containing the core-shell particles. A thin slice of 80-200 nm thickness is then cut from the block piece using a microtome equipped with a diamond blade to prepare a measurement specimen. Thereafter, where necessary, the measurement specimen is subjected to dying treatment using, for example, ruthenium tetroxide or osmium tetroxide.

The measurement specimen is then loaded into a transmission electron microscope (TEM), and an image of cross-sectional structures of the core-shell particles is captured. The magnification of the electron microscope is preferably such that a cross-section of one core-shell particle is within the field of view. Specifically, the magnification is preferably on the order of 10,000×.

In the cross-sectional structure of a captured core-shell particle image, length D1 (circumferential length of core, corresponding to the core outer surface) and length D2 (length of a part where the core outer surface contacts the shell) are measured. Using lengths D1 and D2 measured, the ratio of shell coverage on the core outer surface of that core-shell particle (Rc) is calculated using the following Equation (1):

$$\text{Ratio of coverage } Rc\ (\%) = (D2/D1) \times 100 \tag{1}$$

The ratio of coverage (Rc) is measured for 20 or more core-shell particles, and an average of measured values is calculated to find an average ratio of shell coverage on the core outer surface (ratio of coverage).

Although the ratio of coverage (Rc) can be calculated manually based on cross-sectional structures, calculation can be made using commercially available image analysis software. For example, "AnalySIS Pro" (Olympus Corporation) can be used as such commercially available image analysis software.

The average shell thickness in percentage relative to the volume-average particle diameter (core-shell ratio) of the core-shell particles which may be suitably used as organic particles is preferably 1% or more, more preferably 3% or more, even more preferably 5% or more, and preferably 30% or less, more preferably 25% or less, even more preferably 20% or less. By setting the average shell thickness to 1% or more, it is possible to further increase adhesion in electrolysis solution of the functional layer to improve cycle characteristics of a secondary battery. By setting the average shell thickness to 30% or less, it is possible to further improve output characteristics of a secondary battery.

The average shell thickness can be obtained by the observation of cross-sectional structures of core-shell particles by transmission electron microscopy (TEM). Specifically, the maximum shell thickness in a cross-sectional structure of a core-shell particle is measured by TEM. 20 or more randomly-selected core-shell particles are measured for their maximum shell thickness, and an average of the measured maximum thicknesses is recorded as an average shell thickness. However, in the case that the shell is composed of polymer particles and these polymer particles are arranged in a monolayer without being stacked on top of one another in the radial direction of the core-shell particle, the number-average particle diameter of the polymer particles for the shell is recorded as an average shell thickness.

[Density of Organic Particles]

The organic particles may have any density so long as it is lower than the density of the non-conductive inorganic particles described above and the difference in density between the non-conductive inorganic particles and the organic particles is 1.5 g/cm$^3$ or more. The density of the organic particles is preferably 0.9 g/cm$^3$ or more, more preferably 1.0 g/cm$^3$ or more, and preferably 1.30 g/cm$^3$ or less, more preferably 1.20 g/cm$^3$ or less. If the density of the organic particles is too low, there is a concern that the functional layer exhibits poor ion conductivity due to the presence of the non-conductive inorganic particles localized inside the functional layer. If the density of the organic particles is too high, there is a concern that the non-conductive inorganic particles and the organic particles do not sufficiently separate from each other in the functional layer and therefore the functional layer doe not exhibit sufficient adhesion.

When the organic particles are solid particles or core-shell particles, "density of organic particles" herein refers to a true density of organic particles as measured by the gas displacement method.

When the organic particles are hollow particles, "density of organic particles" herein can be calculated based on the following Equation (2) using the density of hollow particles, as measured based on the gas displacement method using a dry densitometer, and the porosity of the hollow particles measured by transmission electron microscopy:

Density of hollow particles (g/cm$^3$)=(density measured with dry densitometer)×{(porosity)/100}  Equation (2)

The porosity of hollow particles can be calculated by measuring 200 hollow particles for maximum particle diameter (outer diameter) and maximum void (hollow) diameter by transmission electron microscopy, finding the porosity of each hollow particle based on the following Equation (3), and simply averaging the obtained values:

Porosity (%)={(maximum void diameter)$^3$/(maximum particle diameter)$^3$}×100  Equation (3)

When the organic particles are porous particles, "density of organic particles" herein can be calculated based on the following Equation (4) using the density of porous particles, as measured based on the gas displacement method using a dry densitometer, and the porosity of the porous particles measured using a mercury porosimeter:

Density of porous particles (g/cm$^3$)=(density measured with dry densitometer)×{(porosity)/100}  Equation (4)

[Volume-Average Particle Diameter of Organic Particles]

The organic particles may have any volume-average particle diameter (D50) so long as it is 0.80 to 1.50 times the volume-average particle diameter of the non-conductive inorganic particles. The organic particles preferably have a volume-average particle diameter (D50) of 0.15 μm or more, more preferably 0.5 μm or more, even more preferably 0.7 μm or more, particularly preferably 0.8 μm or more, and preferably 3 μm or less, more preferably 2 μm or less, even more preferably 1.5 μm or less, particularly preferably 1.1 μm or less. By setting the volume-average particle diameter of the organic particles to as high as 0.15 μm or more when setting the ratio of the volume-average particle diameter of the organic particles to the volume-average particle diameter of the non-conductive inorganic particles to fall within the specific range, it is possible to further increase adhesion in electrolysis solution of the functional layer. By setting the volume-average particle diameter of the organic particles to 3 μm or less, it is possible for the functional layer formed using the composition for non-aqueous secondary battery functional layer to exert a superior protection function so as to sufficiently increase heat resistance (especially heat shrinkage resistance) of a separator or other battery members, as well as to limit reductions in adhesion due to reduced contact areas of the organic particles.

The "volume-average particle of organic particles" herein can be measured in compliance with JIS Z 8825 irrespective of the structure of the organic particles, and refers to a particle diameter where the cumulative volume from the fine side amounts to 50% of the entire volume in a particle size distribution (volume basis) measured by laser diffraction.

[Content of Organic Particles]

The content of the organic particles in the composition for non-aqueous secondary battery functional layer is preferably 1 part by mass or more, more preferably 3 parts by mass or more, even more preferably 5 parts by mass or more, and preferably 20 parts by mass or less, more preferably 15 parts by mass or less, even more preferably 12 parts by mass or less, per 100 parts by mass of the non-conductive inorganic particles. By setting the content of the organic particles to 1 part by mass or more per 100 parts by mass of the non-conductive inorganic particles, it is possible to increase adhesion in electrolysis solution of the functional layer. By setting the content of the organic particles to 20 part by mass or less per 100 parts by mass of the non-conductive inorganic particles, it is possible to limit reductions in ion conductivity of the functional layer to prevent reductions in output characteristics of a secondary battery, as well as to allow the functional layer to exert a superior protection function to sufficiently increase heat resistance (especially heat shrinkage resistance) of a separator or the like.

<Particulate Polymer>

As described above, the organic particles do not normally exert adhesion when not swollen in electrolysis solution. Thus, from the perspective of preventing the components contained in the functional layer from coming off the functional layer prior to immersion into electrolysis solution, as a binder, it is preferable to use a particulate polymer in combination, which exerts higher adhesion than the organic particles in an environment of 25° C. where the organic particles are not swollen in the electrolysis solution. The use of a particulate polymer can prevent components such as non-conductive inorganic particles from coming off the functional layer both when the organic particles are swollen in electrolysis solution and when they are not swollen in electrolysis solution.

[Composition of Particulate Polymer]

Examples of particulate polymers which may be used in combination with the organic particles include water-insoluble particulate polymers known in the art which are dispersible into dispersion media such as water; specific examples thereof include thermoplastic elastomers. Of thermoplastic elastomers, preferred are conjugated diene-based polymers and acrylic polymers, with acrylic polymers being more preferred.

The term "conjugated diene-based polymer" refers to a polymer containing a conjugated diene monomer unit. Specific examples of conjugated diene-based polymers include polymers containing an aromatic vinyl monomer unit and an aliphatic conjugated diene monomer unit, such as styrene-butadiene copolymer (SBR). The term "acrylic polymer" refers to a polymer containing a (meth)acrylic acid ester monomer unit.

These particulate polymers may be used alone or in combination.

Acrylic polymers as particulate polymers further preferably contain a (meth)acrylonitrile monomer unit. This makes it possible to increase strength of the functional layer.

[Glass-Transition Temperature of Particulate Polymer]

The particulate polymer preferably has a glass-transition temperature of 20° C. or below, more preferably 0° C. or below, even more preferably −10° C. or below. When the glass-transition temperature of the particulate polymer is 20° C. or below, the particulate polymer exerts sufficiently high adhesion compared to the organic particles in an environment where they are not swollen in electrolysis solution, so that components contained in the functional layer can be sufficiently prevented from coming off the functional layer prior to immersion in the electrolysis solution. The glass-transition temperature of the particulate polymer is generally −50° C. or above. The glass-transition temperature of the particulate polymer can be measured in compliance with JIS K7121.

[Volume-Average Particle Diameter of Particulate Polymer]

The volume-average particle diameter (D50) of the particulate polymer is generally smaller than the volume-average particle diameter of the organic particles and is preferably 0.05 μm to 0.5 μm. By setting the volume-average particle diameter D50 of the particulate polymer to 0.05 μm or more, it is possible to increase dispersibility of the particulate polymer as well as to limit reductions in output characteristics of a secondary battery due to the particulate polymer being densely packed in the functional layer to cause rises in the resistance of the functional layer. By setting the volume-average particle diameter D50 of the particulate polymer to 0.5 μm or less, it is possible to increase adhesion of the functional layer as well as to reduce the occurrence of blocking due to the presence of the particulate polymer.

The ratio of the volume-average particle diameter of the particulate polymer to the volume-average particle diameter of the non-conductive inorganic particles (particulate polymer' volume-average particle diameter/non-conductive inorganic particles' volume-average particle diameter) is preferably 0.01 or more, more preferably 0.05 or more, even more preferably 0.10 or more, and preferably 0.60 or less, more preferably 0.55 or less, even more preferably 0.50 or less. By setting the ratio of the volume-average particle diameter of the particulate polymer to the volume-average particle diameter of the non-conductive inorganic particles to 0.01 or more, it is possible to limit reductions in output characteristics of a secondary battery due to the particulate polymer being densely packed in the functional layer to cause rises in the resistance of the functional layer. By setting the ratio of the volume-average particle diameter of the particulate polymer to the volume-average particle diameter of the non-conductive inorganic particles to 0.60 or less, it is possible to reduce the occurrence of blocking due to the presence of the particulate polymer.

[Content of Particulate Polymer]

The content of the particulate polymer in the composition for non-aqueous secondary battery functional layer is preferably 1 part by mass or more, more preferably 5 parts by mass or more, even more preferably 10 parts by mass or more, and preferably 25 parts by mass or less, more preferably 20 parts by mass or less, even more preferably 18 parts by mass or less, per 100 parts by mass of the non-conductive inorganic particles. By setting the content of the particulate polymer to 1 part by mass or more per 100 parts by mass of the non-conductive inorganic particles, it is possible to sufficiently prevent the non-conductive inorganic particles and the organic particles from coming off the functional layer, as well as to increase adhesion of the functional layer. By setting the content of the particulate polymer to 25 parts by mass or less per 100 parts by mass of the non-conductive inorganic particles, it is possible to limit reductions in ion conductivity of the functional layer to prevent reductions in output characteristics of a secondary battery.

Examples of methods of producing the particulate polymer include solution polymerization, suspension polymerization, and emulsion polymerization. Of these polymerization methods, preferred are emulsion polymerization and suspension polymerization because polymerization can be effected in water and therefore a water dispersion containing a particulate polymer can be suitably directly used as a material for the composition for non-aqueous secondary battery functional layer. Upon production of a particulate polymer, the reaction system preferably contains a dispersant. In general, the particulate polymer is substantially formed of a polymer that constitutes that particulate polymer. However, the particulate polymer may also have optional component(s) such as additives which were used for polymerization.

<Additional Components>

The composition for non-aqueous secondary battery functional layer may contain optional additional component(s) in addition to the components described above. Any of the additional components known in the art can be used so long as the battery reactions are not affected. These additional components may be used alone or in combination.

Examples of the additional components include additives known in the art, such as viscosity modifiers, wetting agents, and additives for electrolysis solution.

<Preparation Method of Composition for Non-Aqueous Secondary Battery Functional Layer>

Any method can be employed for the preparation of the composition for non-aqueous secondary battery functional layer. The functional layer composition is normally prepared by mixing together the non-conductive inorganic particles described above, the organic particles described above, water as a dispersion medium, and optionally the particulate polymer and additional component(s) which are used where necessary. Any method can be used for mixing. For efficient mixing of the components, mixing is normally performed using a dispersing device as a mixing device.

The dispersing device is preferably capable of uniformly dispersing and mixing the components described above. Examples of the dispersing device include ball mill, sand mill, pigment disperser, grinding machine, ultrasonic disperser, homogenizer, and planetary mixer. For their ability to apply a high dispersing shear force, high-dispersing devices such as bead mill, roll mill, and FILMIX can also be exemplified.

(Non-Aqueous Secondary Battery Functional Layer)

The non-aqueous secondary battery functional layer can be formed on a proper substrate using the composition for non-aqueous secondary battery functional layer described above. That is, the non-aqueous secondary battery functional layer contains at least the non-conductive inorganic particles, the organic particles, and optionally the particulate polymer and additional components used as necessary. Each component contained in the functional layer is the one contained in the composition for non-aqueous secondary battery functional layer. The preferred abundance of each component in the non-aqueous secondary battery functional layer is the same as that in the composition for non-aqueous secondary battery functional layer. Further, it appears that the organic particles are localized on the surface side and the non-conductive inorganic particles are localized on the substrate side in the non-aqueous secondary battery functional layer. That is, it appears that the organic particles are more abundant on the surface side than on the substrate side and the non-conductive inorganic particles are more abundant on the substrate side than on the surface side in the thickness direction of the non-aqueous secondary battery functional layer.

The non-aqueous secondary battery functional layer can exert a function as a protection layer that increases heat resistance and strength of a battery member provided with the functional layer, as well as a function as an adhesive layer that firmly bonds together battery members (e.g., separator and electrode) in electrolysis solution.

An exemplary method of forming the functional layer on a substrate using the composition for non-aqueous secondary battery functional layer involves applying the composition onto a proper substrate to form a coating film, and drying the coating film. The functional layer formed on the substrate can be used in any way: the functional layer may be formed for example on a separator substrate to manufacture a battery member such as a separator; the functional layer formed on a releasable substrate may be once separated from the substrate and then bonded to another substrate to manufacture a battery member; and so forth. The functional layer may be formed on an electrode.

However, from the perspective of increasing the manufacturing efficiency of a battery member by not performing the step of separating a releasable substrate from the functional layer, it is preferable to use a separator substrate or the like as a substrate. The functional layer provided on a separator substrate can be suitably used as a single layer that simultaneously exerts a function as a protection film that increases heat resistance and strength of a separator, and a function as an adhesive layer that firmly bonds together a separator and an electrode particularly in electrolysis solution.

A separator that includes a separator substrate and the non-aqueous secondary battery functional layer formed on the separator substrate (functional layer-attached separator) can be manufactured in fewer steps and in less time than the conventional separator having a protection layer and an adhesive layer, and therefore can be manufactured at high productivity. Further, the separator that includes a separator substrate and the functional layer utilizes specific organic particles to exert adhesion and therefore can allow a non-aqueous secondary battery to exert high battery characteristics compared to the conventional separator having a protection layer and an adhesive layer. Further, since the separator that includes a separator substrate and the non-aqueous secondary battery functional layer formed on the separator substrate comprises non-conductive inorganic particles and organic particles which satisfy a specific density difference and a specific volume-average particle diameter ratio, the separator can exert superior adhesion and heat resistance (especially, heat shrinkage resistance).

The functional layer may be formed only on one side or both sides of a separator substrate. Using a separator having the functional layer only on one side of the separator substrate, it is possible to manufacture a secondary battery wherein the positive electrode and separator, or the negative electrode and separator, are firmly bonded together in electrolysis solution by means of the functional layer. Further, using a separator having the functional layer on both sides of a separator substrate, it is possible to manufacture a secondary battery wherein the positive electrode, separator and negative electrode are firmly bonded together in electrolysis solution by means of the functional layers.

(Non-Aqueous Secondary Battery)

The disclosed non-aqueous secondary battery comprises a battery member provided with the non-aqueous secondary battery functional layer described above. Specifically, the disclosed non-aqueous secondary battery comprises a positive electrode; a negative electrode; a separator that includes a separator substrate and the non-aqueous secondary battery functional layer described above formed on the separator substrate (functional layer-attached separator); and electrolysis solution. In the disclosed non-aqueous secondary battery, the positive electrode and separator, and/or, the negative separator and separator are firmly bonded together in electrolysis solution by means of the non-aqueous secondary battery functional layer, so that increases in inter-electrode distance associated with repeated cycles of charge and discharge are suppressed resulting in good battery characteristics such as cycle characteristics. In the disclosed non-aqueous secondary battery, the separator exhibits increased heat resistance and strength by means of the non-aqueous secondary battery functional layer. Further, compared to cases where the conventional separator having a protection layer and an adhesive layer is used, the disclosed non-aqueous secondary battery can be manufactured at high productivity by shortening the time required for separator manufacture.

The positive electrode, negative electrode, separator substrate and electrolysis solution described above can be those known in the art which are used in non-aqueous secondary batteries.

Specifically, the electrodes (positive electrode and negative electrode) can be formed of a current collector and an electrode mixed material layer formed on the current collector. The current collector may be made of a metal material such as iron, copper, aluminum, nickel, stainless steel, titanium, tantalum, gold, or platinum. Of these metal materials, the current collector for the negative electrode is preferably made of copper. Further, the current collector for positive electrode is preferably made of aluminum. The electrode mixed material layer can be a layer including an electrode active material and a binder.

The electrolysis solution can be normally an organic electrolysis solution obtained by dissolving a supporting electrolyte into an organic solvent. For example, when the non-aqueous secondary battery is a lithium ion secondary battery, a lithium salt is used as the supporting electrolyte. For example, when the non-aqueous secondary battery is a lithium ion secondary battery, a lithium salt is used as the supporting electrolyte. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred in that they easily dissolve in solvent and exhibit a high degree of dissociation, with $LiPF_6$ being particularly preferred. Electrolytes may be used alone or in combination at any ratio. Normally, the lithium ion conductivity tends to increase as a supporting electrolyte with a higher degree of dissociation is used. Therefore, the lithium ion conductivity can be adjusted by the type of supporting electrolyte.

Any organic solvent that can dissolve the supporting electrolyte may be used as the organic solvent in the electrolysis solution. Preferred examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. A mixed solution of these solvents may also be used. Among these solvents, carbonates are preferred for their high dielectric constant and broad stable potential region, and a mixture of ethylene carbonate and ethyl methyl carbonate is more preferred.

The concentration of the electrolyte in the electrolysis solution can be adjusted as needed. For example, the concentration is preferably 0.5% to 15% by mass, more preferably 2% to 13% by mass, even more preferably 5% to 10% by mass. Any additive known in the art may be added to the electrolysis solution, such as fluoroethylene carbonate or ethyl methyl sulfone.

Any separator substrate can be used; for example, those described in JP2012204303A can be used. Of these separator substrates, fine porous membranes made of polyolefinic (i.e., polyethylene, polypropylene, polybutene, or polyvinyl chloride) resin are preferred for their ability to reduce total separator thickness thus increasing the ratio of the electrode active material in the secondary battery and consequently increasing the capacity per volume.

<Method of Manufacturing Non-Aqueous Secondary Battery>

The disclosed non-aqueous secondary battery can be manufactured for example by stacking a positive electrode and a negative electrode with a separator having the above-described non-aqueous secondary battery functional layer provided therebetween, winding or folding the resulting laminate as necessary in accordance with the battery shape, placing it in a battery container, filling the battery container with an electrolysis solution, and sealing the container. To prevent an internal pressure rise in the non-aqueous secondary battery and the occurrence of overcharge/overdischarge and other events, the non-aqueous secondary battery may include, for example, an overcurrent preventing device such as a fuse or a PTC device; expanded metal; and/or a lead plate where necessary. The secondary battery may take any shape, such as coin, button, sheet, cylindrical, square or flat shape.

EXAMPLES

Hereinafter, the present disclosure will be specifically described with reference to Examples; however, the disclosure is not limited to the Examples. In the following, "%" and "parts" used to express quantities are by mass, unless otherwise specified.

In a polymer produced by copolymerization of more than one monomer, the percentage of a structural unit formed by polymerization of a monomer in the polymer is consistent with the proportion (blending ratio) of the monomer in the total monomers used for the polymerization of the polymer, unless otherwise indicated.

In Examples and Comparative Examples, the degree of swelling in electrolysis solution of organic particle polymer; the average ratio of shell coverage on the outer core surface of organic particle (ratio of coverage); the average shell thickness of organic particles (core-shell ratio); the volume-average particle diameters D50 of particles (non-conductive inorganic particles, organic particles, and particulate polymer); the densities of non-conductive inorganic particles and organic particles; the glass-transition temperatures of polymers (core polymer, shell polymer, solid particle polymer, and particulate polymer); heat resistance and blocking resistance of a functional layer-attached separator; peel strength between the functional layer-attached separator and electrode; and low-temperature output characteristics, bulging resistance, and low-temperature output characteristics and high-temperature cycle characteristics of a secondary battery were measured and evaluated by the methods described below.

<Degrees of Swelling in Electrolysis Solution of Organic Particle Polymers>

For organic particles formed of core-shell particles, monomer compositions used for the preparation of the core and shell of the organic particles were used to prepare water dispersions of polymers (for core and for shell) as measurement specimens under the same polymerization conditions as those used for the core and the shell. For organic particles formed of solid particles, water dispersions of organic particles formed of solid particles were prepared.

Next, the water dispersions thus obtained were each placed in a polytetrafluoroethylene Petri dish and dried at 25° C. for 48 hours to prepare powder, which was subjected to heat pressing at 200° C. to manufacture a 0.5 mm thick film. Each obtained film was cut into a 1 cm×1 cm square sheet to provide a test specimen. The weight (W0) of the test specimen was measured. The test specimen was immersed into electrolysis solution at 60° C. for 72 hours. The test specimen was then taken out from the electrolysis solution, the electrolysis solution on the surface of the test specimen was wiped off, and the weight (W1) of the test specimen after immersion was measured. Using weights W0 and W1, the degree of swelling S (fold) was calculated based on the equation S=W1/W0.

The electrolysis solution was prepared by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume), SP value: 12.7 $(cal/cm^3)^{1/2}$) at a concentration of 1 mol/L.

<Average Ratio of Shell Coverage on Outer Core Surface of Organic Particle (Ratio of Coverage)>

Organic particles were fully dispersed in visible light-curable epoxy resin ("D-800" from JEOL Ltd.) and then embedded to form a block piece containing the organic particles. A thin slice of 100 nm thickness was then cut from the block piece using a microtome equipped with a diamond blade to prepare a measurement specimen. Thereafter, the measurement specimen was subjected to dying treatment using ruthenium tetroxide.

The dyed measurement specimen was then loaded into a transmission electron microscope ("JEM-3100F" from JEOL Ltd.), and an image of a cross-sectional structure of an organic particle was captured at an acceleration voltage of 80 kV. The magnification of the electron microscope was set such that a cross-section of one organic particle was within the field of view. In the cross-sectional structure of the captured organic particle, length D1 (circumferential length of the core) and length D2 (length of a part where the core outer surface contacts the shell) were measured, and the ratio of shell coverage on the core outer surface of that organic particle (Rc) was calculated using the following Equation (1):

$$\text{Ratio of coverage Rc (\%)}=(D2/D1)\times100 \quad (1)$$

The ratio of coverage (Rc) was measured for 20 randomly-selected organic particles, and an average was calculated. The calculated average was recorded as an average ratio of shell coverage on the core outer surface (ratio of coverage).

<Average Shell Thickness (Core-Shell Ratio) of Organic Particle>

The average shell thickness of organic particles was measured through the procedure described below. When the shell is composed of polymer particles, a cross-sectional structure of an organic particle was observed by transmission electron microcopy as in the measurement of the coverage ratio described above. From the cross-sectional structure of the organic particle observed, the maximum diameter of shell polymer particles was then measured. 20 randomly-selected organic particles were measured for maximum diameter of shell polymer particles, and an average of the maximum diameters was recorded as an average shell thickness.

When the shell has a shape other than particulate shape, a cross-sectional structure of an organic particle was observed by transmission electron microcopy as in the measurement of the coverage ratio described above. From the cross-sectional structure of the organic particle observed, the maximum shell thickness was measured. 20 randomly-selected organic particles were measured for maximum shell thickness, and an average of the maximum shell thicknesses was recorded as an average shell thickness.

The core-shell ratio (unit: %), which represents the ratio of average shell thickness to volume-average particle diameter of organic particles, was then calculated by dividing the measured average shell thickness by the volume-average particle diameter of the organic particles for evaluation of average shell thickness.

<Volume-Average Particle Diameters of Particles>

Water dispersions of polymers (non-conductive inorganic particles, organic particles, and particulate polymer) were prepared. Specifically, for organic particles and particulate polymer, water dispersions adjusted to have a solid content concentration of 15% by mass were prepared for measurement. For non-conductive inorganic particles, water dispersions were prepared by dispersing the non-conductive inorganic particles using a media-less dispersing device.

To the non-conductive inorganic particles for dispersing treatment were added a polycarboxylic acid-based dispersant (SN Dispersant 5020, SAN NOPCO Ltd.) in amounts equal to those used to prepare functional layer compositions in Examples and Comparative Examples (2.5 parts by mass per 100 parts by mass of non-conductive inorganic particles in Examples 1-7 and 10-12 and Comparative Examples 1 and 2; 1 part by mass per 100 parts by mass of non-conductive inorganic particles in Example 8; and 3 parts by mass per 100 parts by mass of non-conductive inorganic particles in Example 9), and water to a solid content concentration of 50%.

For dispersing treatment, a media-less dispersing device (Inline Mill MKO, IKA Works, Inc.) was used under the following condition: rotor-stator gap=0.1 mm, circumferential speed=10 m/sec, flow rate=200 L/hr, the number of operations=one pass.

Using the water dispersions of the respective particles, particle size distributions were measured with a laser diffraction particle size analyzer (SALD-3100, Shimadzu Corporation). For each particle size distribution, the particle diameter where the cumulative volume from the fine side amounts to 50% of the entire volume was recorded as a volume-average particle diameter (D50).

<Densities of Non-Conductive Inorganic Particles and Organic Particles>

The densities of the non-conductive inorganic particles and organic particles were measured based on the gas displacement method using a dry automatic densitometer (AccuPyc II 1340, Shimadzu Corporation).

<Glass-Transition Temperatures of Core Polymer, Shell Polymer, Solid Particle Polymer, and Particulate Polymer>

Using monomer compositions used for the preparation of the respective polymers, water dispersions of polymers as measurement specimens were prepared using the same polymerization conditions as those used for the polymers.

Next, a DSC curve was measured on a differential scanning calorimeter ("EXSTAR DSC6220" from SII Nano-Technology Inc.) at normal temperature and normal humidity in the measurement temperature range of −100° C. to 500° C. at a heating rate of 10° C./min, where 10 mg of dried sample specimen was weighed into an aluminum pan, and an empty aluminum pan was used as a reference. The glass-transition temperature was determined from the point of intersection of the baseline immediately before appearance of an endothermic peak in the DSC curve where the differential signal (DDSC) reaches 0.05 mW/min/mg or higher with the tangent to the DSC curve at the inflection point that appears first after the endothermic peak, in this heating step.

<Heat Resistance of Functional Layer-Attached Separator>

The functional layer-attached separator manufactured was cut into a 12 cm×12 cm square piece, and a 10 cm×10 cm square image was drawn within the square to prepare a test specimen. The test specimen was placed for 1 hour in a thermostat chamber set at 130° C., and % change in the area of the square image drawn on the square (=[(square area before placement in chamber)−(square area after placement in chamber)/square area before placement in chamber]×100] was found as a % thermal shrinkage and evaluated based on the criteria given below. A smaller % thermal shrinkage indicates superior heat resistance of the functional layer-attached separator.

A: % thermal shrinkage is less than 5%
B: % thermal shrinkage is 5% or greater to less than 10%
C: % thermal shrinkage is 10% or greater <Blocking Resistance of Functional Layer-Attached Separator>

The prepared separator was cut into 5 cm×5 cm square pieces and 4 cm×4 cm square pieces to prepare two pairs of test specimens. Two samples were then prepared: one obtained by simply placing the two test specimens on top of each other (non-pressed sample), and the other obtained by placing the two test specimens on top of each other and placing the laminate under a pressure of 10 g/cm² at 40° C. (pressed sample). The samples were allowed to stand for 24 hours.

Each sample left to stand for 24 hours was checked for the state of bonding (blocking) of the separators which was evaluated based on the following criteria:

A: Bonding of the separators were not observed for both of the non-pressed sample and pressed sample
B: Bonding of the separators was not observed for the non-pressed sample, but observed for the pressed sample <Adhesion Between Functional Layer-Attached Separator and Electrode>

The manufactured laminate having a negative electrode and a functional layer-attached separator was cut into a 10 mm-width piece to prepare a test specimen. The test specimen was immersed in electrolysis solution for 3 days at 60° C. The electrolysis solution was prepared by dissolving supporting electrolyte $LiPF_6$ into a mixture solvent of ethylene carbonate, diethyl carbonate and vinylene carbonate (mixing ratio: ethylene carbonate/diethyl carbonate/vinylene carbonate=68.5/30/1.5 (by volume), SP value: 12.7 $(cal/cm^3)^{1/2}$) at a concentration of 1 mol/L.

The test specimen was then taken out from the electrolysis solution, and the electrolysis solution on the surface of the test specimen was wiped off. An adhesive cellophane tape was then attached to the surface of the electrode (negative electrode) of the test specimen with the surface of the current collector of the electrode facing down. An adhesive cellophane tape specified in JIS Z1522 was used. The adhesive cellophane tape had been affixed on the horizontal test stage beforehand. Subsequently, the stress at the time when the separator was peeled by pulling up one end in the vertical direction at a pulling rate of 50 mm/min was measured. The measurement was made 3 times. An average of measured stress values was recorded as peel strength which was evaluated based on the criteria given below. Greater peel strength indicates superior adhesion in electrolysis solution of the functional layer, indicating that the functional layer-attached separator and electrode are firmly bonded together.

A: Peel strength is 5.0 N/m or more
B: Peel strength is 3.0 N/m or more to less than 5.0 N/m
C: Peel strength is less than 3.0 N/m <Low-Temperature Output Characteristics of Secondary Battery>

The manufactured spirally wound lithium ion secondary battery with a discharge capacity of 800 mAh was allowed to stand for 24 hours in the environment of 25° C., and then charged at 0.1 C for 5 hours in the environment of 25° C. Voltage V0 at that time was measured. The lithium ion secondary battery was discharged at 1 C in the environment of −15° C., and a voltage measured 15 seconds after the initiation of discharge was recorded as V1. Voltage change ΔV (=V0−V1) was then found and evaluated based on the criteria given below. A smaller voltage change indicates superior low-temperature output characteristics of secondary battery.

A: Voltage change ΔV is less than 350 mV
B: Voltage change ΔV is 350 mV or greater to less than 500 mV
C: Voltage change ΔV is 500 mV or greater <High-Temperature Cycle Characteristics of Secondary Battery>

The manufactured spirally wound lithium ion secondary battery with a discharge capacity of 800 mAh was allowed to stand for 24 hours in the environment of 25° C., and then charged at 0.1 C to 4.35V and discharged at 0.1 C to 2.75V in the environment of 25° C., and initial capacity C0 was measured. In the environment of 60° C., the above-described charging/discharging was repeated, and capacity C1 after 1,000 cycles of charge and discharge was measured.

% Capacity maintenance after 1,000 cycles of charge and discharge ΔC (=(C1/C0)×100) was calculated and evaluated based on the criteria below. A higher % capacity maintenance ΔC indicates superior high-temperature cycle characteristics and therefore longer life of secondary battery.

A: % capacity maintenance ΔC is 84% or greater
B: % capacity maintenance ΔC is 80% to less than 84%
C: % capacity maintenance ΔC is less than 80%

Example 1

<Preparation of Organic Particles>

A 5 MPa pressure-resistant vessel equipped with a stirrer was charged with, as monomers for core, 75 parts of methyl methacrylate (MMA) as a (meth)acrylic acid ester monomer, 4 parts of methacrylic acid (MAA) as a (meth)acrylic acid monomer and 1 part of ethylene glycol dimethacrylate (EDMA) as a cross-linkable monomer, 0.5 parts of sodium dodecylbenzene sulfonate as an emulsifier, 150 parts of ion-exchanged water, and 0.5 parts of potassium persulfate as a polymerization initiator. After fully stirred, the temperature was raised to 60° C. to initiate polymerization. When the polymerization conversion rate reached 96%, a mixture of 19 parts of styrene (ST) as an aromatic vinyl monomer and 1 part of methacrylic acid (MAA) as an acid group-containing monomer was then continuously added as monomers for shell, and the reaction mass was heated to 70 C° to continue polymerization. When the polymerization conversion rate reached 96%, the reaction was quenched by cooling to produce a water dispersion containing organic particles formed of core-shell particles.

The resultant organic particles were measured for ratio of coverage, core-shell ratio, volume-average particle diameter, and density. The polymer of the organic particles was measured for degree of swelling in electrolysis solution and glass-transition temperature. The results are shown in Table 1.

<Preparation of Particulate Polymer>

A reactor equipped with a stirrer was charged with 70 parts of ion-exchanged water, 0.15 parts of sodium lauryl sulfate ("EMAL 2F" from Kao Chemicals) as an emulsifier and 0.5 parts of ammonium persulfate as a polymerization initiator, the gas phase was purged with nitrogen gas, and the temperature was raised to 60° C.

In another vessel, 50 parts of ion-exchanged water, 0.5 parts of sodium dodecylbenzenesulfonate as a dispersant, 94 parts of butyl acrylate as a (meth)acrylic acid ester monomer, 2 parts of acrylonitrile, 2 parts of methacrylic acid, 1 part of N-methylol acrylamide, and 1 part of acrylamide were mixed to afford a monomer mixture. The monomer mixture was continuously added to the reactor over 4 hours to effect polymerization. During addition, the temperature was retained at 60° C. for polymerization reaction. After completion of addition, the reaction mass was stirred for further 3 hours at 70° C. to afford a water dispersion containing a particulate polymer.

The resultant particulate polymer was measured for volume-average particle diameter and glass-transition temperature. The results are shown in Table 1.

<Preparation of Functional Layer Composition>

A crude dispersion of non-conductive inorganic particles was prepared by adding 2.5 parts of a polycarboxylic acid-based dispersant (SN Dispersant 5020, SAN NOPCO Ltd.) to 100 parts of spherical barium sulfate (non-conductive inorganic particles) and adding water to a solid content concentration of 50%. The crude dispersion was subjected to dispersing treatment by passing it through a media-less dispersing device (Inline Mill MKO, IKA Works, Inc.) once to prepare a water dispersion of barium sulfate. Using the resultant water dispersion, the barium sulfate as non-conductive inorganic particles was measured for volume-average particle diameter and density. The dispersing treatment of the crude dispersion using the medial-less dispersing device was carried out under the following condition: rotor-stator gap=0.1 mm, circumferential speed=10 m/sec, flow rate=200 L/hr.

100 parts of in terms of solid content of spherical barium sulfate (volume-average particle diameter: 0.8 μm, density: 4.5 g/cm$^3$) as non-conductive inorganic particles in the water dispersion and 6 parts in terms of solid content of the organic particles were mixed with ion-exchange water and dispersed. Further, 14 parts of in terms of solid content of the water dispersion containing the particulate polyme and 0.2 parts of polyethylene glycol-based surfactant ("SAN NOPCO® (SAN NOPCO is a registered trademark in Japan, other countries, or both) SN Wet 366" from SAN NOPCO Ltd.) as a wetting agent were added and mixed to prepare a functional layer composition which was adjusted to have a solid content concentration of 15%.

<Manufacture of Functional Layer and Functional Layer-Attached Separator>

As a separator substrate, an organic separator (thickness: 16 μm, Gurley number: 210 s/100 cc) made of polyethylene porous material was provided. The functional layer composition prepared above was applied on both sides of the substrate and dried at 50° C. for 3 minutes. In this way a separator having a functional layer of 3 μm thickness per side (functional layer-attached separator) was manufactured.

The resultant functional layer-attached separator was evaluated for heat resistance and blocking resistance. The results are shown in Table 1.

<Manufacture of Negative Electrode>

A 5 MPa pressure-resistant vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzene sulfonate as an emulsifier, 150 parts of ion-exchanged water, and 0.5 parts of potassium persulfate as a polymerization initiator. After fully stirred, the temperature was raised to 50° C. to initiate polymerization. When the polymer conversion rate reached 96%, the reaction was quenched by cooling to afford a mixture containing a particulate binder (SBR). After adjusting the pH of the mixture containing a particulate binder to 8 by the addition of 5% sodium hydroxide aqueous solution, unreacted monomers were removed by thermal-vacuum distillation. Thereafter, the mixture was cooled to 30° C. or below to afford a water dispersion containing a desired particulate binder for negative electrode.

Next, 100 parts of synthetic graphite (volume-average particle diameter: 15.6 μm) as a negative electrode active material, 1 part in terms of solid content of 2% aqueous solution of sodium salt of carboxymethyl cellulose ("MAC350HC" from Nippon Paper Industries Co., Ltd) as a viscosity modifier and ion-exchanged water were mixed to a solid content concentration of 68%, and mixed for 60 minutes at 25° C. Subsequently, the solid content concentration was adjusted to 62% by the addition of ion-exchanged, and the mixture was further mixed at 25° C. for 15 minutes. To the mixture obtained were added 1.5 parts in terms of solid content of the water dispersion containing the particulate binder for negative electrode and ion-exchanged water to a final solid content concentration of 52%, and further mixed for 10 minutes. The resultant mixture was subjected to defoaming treatment under reduced pressure to afford a slurry composition for negative electrode with good fluidity.

The negative electrode slurry composition thus obtained was applied by a comma coater onto a 20 μm-thick copper foil (current collector) to a dry film thickness of on the order of 150 μm, and dried. This drying was performed by transporting the copper foil through an oven at 60° C. at a rate of 0.5 m/min over 2 minutes. After that, the copper foil was heat-treated for 2 minutes at 120° C. Thus, a pre-press web of negative electrode was obtained. The pre-press web of negative electrode was rolled with a roll press to afford a post-press negative electrode in which the negative electrode mixed material layer is 80 μm in thickness.

<Manufacture of Positive Electrode>

100 parts of LiCoO$_2$ as a positive electrode active material (volume-average particle diameter: 12 μm), 2 parts of acetylene black (HS-100, Denka Company Ltd.) as a conductor, 2 parts in terms of solid content of polvinylidene difluoride (#7208, KUREHA Corporation) as a binder, and N-methyl pyrrolidone were mixed to a total solid content concentration of 70%. These materials were mixed with a planetary mixer to prepare a positive electrode slurry composition.

The positive electrode slurry composition thus obtained was applied by a comma coater onto a 20 μm-thick aluminum foil (current collector) to a dry film thickness of on the order of 150 μm, and dried. This drying was performed by transporting the aluminum foil through an oven at 60° C. at a rate of 0.5 m/min over 2 minutes. After that, the aluminum foil was heat-treated for 2 minutes at 120° C. Thus, a web of positive electrode was obtained. The pre-press web of positive electrode was rolled with a roll press to afford a post-press positive electrode in which the positive electrode mixed material layer is 80 μm in thickness.

<Manufacture of Laminate with Electrode and Functional Layer-Attached Separator for Adhesion Evaluation>

The negative electrode and functional layer-attached separator obtained above were cut into a 14 mm-diameter circle and a 18 mm-diameter circle, respectively. After placing the negative electrode mixed material layer of the negative electrode onto the functional layer of the circular functional layer-attached separator, they were heat-pressed at 80° C. under a pressure of 0.5 MP for 10 seconds to manufacture a laminate including the negative electrode and functional layer-attached separator.

The resultant laminate was used to evaluate peel strength between the functional layer-attached separator and electrode. The results are shown in Table 1.

<Manufacture of Lithium Ion Secondary Battery>

The post-press positive electrode obtained above was cut into a 49 cm×5 cm piece and placed with the surface of the positive electrode mixed material layer facing up. A 120 cm×5.5 cm cut piece of the separator having a functional layer on both sides was placed on the surface of the positive electrode mixed material layer such that the positive electrode is positioned on the left side in longitudinal direction of the separator. Further, the post-press negative electrode obtained above was cut into a 50 cm×5.2 cm piece and placed on the separator such that the surface of the negative electrode mixed material layer faces the separator and that the negative electrode is positioned on the right side in longitudinal direction of the separator. Using a winder this laminate was wound about the longitudinal center of the separator into a roll. The roll was pressed at 60° C. under a pressure of 0.5 MPa into a flat form and enclosed by an aluminum packaging case as a battery outer package. Electrolysis solution (solvent: ethylene carbonate/diethyl carbonate/vinylene carbonate=68.5/30/1.5 (by volume); electrolyte: 1M $LiPF_6$) was injected so as not to leave air. In order to tightly seal up the opening of the aluminum outer package, the aluminum package was closed by heat sealing at 150° C. In this way a spirally wound lithium ion secondary battery with a discharge capacity of 800 mAh was manufactured as a non-aqueous secondary battery.

The resultant lithium ion secondary battery was evaluated for low-temperature output characteristics and high-temperature cycle characteristics. The results are shown in Table 1.

Examples 2-4

Organic particles, particulate polymers, functional layer compositions, functional layers, functional layer-attached separators, negative electrodes, positive electrodes, and laminates having an electrode and a functional layer-attached separator were prepared and lithium ion secondary batteries were manufactured as in Example 1 except that the amount of the emulsifier sodium dodecylbenzene sulfonate used was changed to 0.7 parts (Example 2), 0.35 parts (Example 3) or 0.9 parts (Example 4) upon preparation of organic particles. Evaluations were performed as in Example 1. The results are shown in Table 1.

Example 5

Organic particles, particulate polymer, functional layer composition, functional layer, functional layer-attached separator, negative electrode, positive electrode, and laminate having an electrode and a functional layer-attached separator were prepared and a lithium ion secondary battery was manufactured as in Example 1 except that the types and amounts of monomers added to form the shell of organic particles upon formation of the organic particles was changed as shown in Table 1. Evaluations were performed as in Example 1. The results are shown in Table 1.

Examples 6 and 7

Organic particles, particulate polymers, functional layer compositions, functional layers, functional layer-attached separators, negative electrodes, positive electrodes, and laminates having an electrode and a functional layer-attached separator were prepared and lithium ion secondary batteries were manufactured as in Example 1 except that the blending amount of the organic particles was changed to 10.5 parts (Example 6) or 3 parts (Example 7) upon preparation of the functional layer composition. Evaluations were performed as in Example 1. The results are shown in Table 1.

Example 8

Organic particles, particulate polymer, functional layer composition, functional layer, functional layer-attached separator, negative electrode, positive electrode, and laminate having an electrode and a functional layer-attached separator were prepared and a lithium ion secondary battery was manufactured as in Example 1 except that the amount of the emulsifier sodium dodecylbenzene sulfonate used was changed to 0.2 parts upon preparation of the organic particles and that the amount of the polycarboxylic acid-based dispersant (SN Dispersant 5020, SAN NOPCO Ltd.) used was changed to 1 part and a water dispersion of spherical barium sulfate (volume-average particle diameter: 1.5 μm, density: 4.5 $g/cm^3$) was used upon preparation of the functional layer composition. Evaluations were performed as in Example 1. The results are shown in Table 1.

Example 9

Organic particles, particulate polymer, functional layer composition, functional layer, functional layer-attached separator, negative electrode, positive electrode, and laminate having an electrode and a functional layer-attached separator were prepared and a lithium ion secondary battery was manufactured as in Example 1 except that the amount of the emulsifier sodium dodecylbenzene sulfonate used was changed to 1.5 parts upon preparation of the organic particles and that the amount of the polycarboxylic acid-based dispersant (SN Dispersant 5020, SAN NOPCO Ltd.) used was changed to 3 parts and a water dispersion of spherical barium sulfate (volume-average particle diameter: 0.3 μm, density: 4.5 $g/cm^3$) was used upon preparation of the functional layer composition. Evaluations were performed as in Example 1. The results are shown in Table 1.

Example 10

Organic particles, particulate polymer, functional layer composition, functional layer, functional layer-attached separator, negative electrode, positive electrode, and laminate having an electrode and a functional layer-attached separator were prepared and a lithium ion secondary battery was manufactured as in Example 1 except that the amount of the emulsifier sodium lauryl sulfate used was changed to 0.7 parts upon preparation of the particulate polymer. Evaluations were performed as in Example 1. The results are shown in Table 1.

Example 11

Organic particles, particulate polymer, functional layer composition, functional layer, functional layer-attached separator, negative electrode, positive electrode, and laminate having an electrode and a functional layer-attached separator were prepared and a lithium ion secondary battery was manufactured as in Example 1 except that the types and amounts of monomers added to form the core of organic particles upon formation of the organic particles was changed as shown in Table 1. Evaluations were performed as in Example 1. The results are shown in Table 1.

Example 12

Organic particles, particulate polymer, functional layer composition, functional layer, functional layer-attached separator, negative electrode, positive electrode, and laminate having an electrode and a functional layer-attached separator were prepared and a lithium ion secondary battery was manufactured as in Example 1 except that organic particles prepared in the manner described below were used instead of the organic particles formed of core-shell particles. Evaluations were performed as in Example 1. The results are shown in Table 1.
<Preparation of Organic Particles>

A 5 MPa pressure-resistant vessel equipped with a stirrer was charged with 95 parts of styrene (ST) as an aromatic vinyl monomer, 5 parts of methacrylic acid (MAA) as an acid group-containing monomer, 0.5 parts of sodium dodecylbenzene sulfonate as an emulsifier, 150 parts of ion-exchanged water, and 0.5 parts of potassium persulfate as a polymerization initiator. After fully stirred, the temperature was raised to 60° C. to initiate polymerization. When the polymerization conversion rate reached 96%, the reaction was quenched by cooling to produce a water dispersion containing organic particles formed of solid particles.

Comparative Examples 1 and 2

Organic particles, particulate polymers, functional layer compositions, functional layers, functional layer-attached separators, negative electrodes, positive electrodes, and laminates having an electrode and a functional layer-attached separator were prepared and lithium ion secondary batteries were manufactured as in Example 1 except that the amount of the emulsifier sodium dodecylbenzene sulfonate used was changed to 0.25 parts (Comparative Example 1) or 2 parts (Comparative Example 2) upon preparation of the organic particles. Evaluations were performed as in Example 1. The results are shown in Table 1.

In Table 1 shown below, "MMA" represents methyl methacrylate; "BA" butyl acrylate; "MAA" methacrylic acid; "EDMA" ethylene glycol dimethacrylate; "ST" styrene; and "AN" acrylonitrile.

TABLE 1

| Functional layer composition | | | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 |
|---|---|---|---|---|---|---|---|---|---|---|---|---|---|---|---|---|---|---|
| Non-conductive inorganic particles | Barium sulfate | Volume-average particle diameter [μm] | | | 0.8 | 0.8 | 0.8 | 0.8 | 0.8 | 0.8 | 0.8 | 1.5 | 0.3 | 0.8 | 0.8 | 0.8 | 0.8 | 0.8 |
| | | Density [g/cm³] | | | 4.5 | 4.5 | 4.5 | 4.5 | 4.5 | 4.5 | 4.5 | 4.5 | 4.5 | 4.5 | 4.5 | 4.5 | 4.5 | 4.5 |
| | | Blending amount [parts by mass] | | | 100 | 100 | 100 | 100 | 100 | 100 | 100 | 100 | 100 | 100 | 100 | 100 | 100 | 100 |
| Organic particles | Core-shell particles | Core | Composition | MMA [mass %] | 75 | 75 | 75 | 75 | 75 | 75 | 75 | 75 | 75 | 75 | 40 | — | 75 | 75 |
| | | | | BA [mass %] | — | — | — | — | — | — | — | — | — | — | 34 | — | — | — |
| | | | | MAA [mass %] | 4 | 4 | 4 | 4 | 4 | 4 | 4 | 4 | 4 | 4 | 4 | — | 4 | 4 |
| | | | | EDMA [mass %] | 1 | 1 | 1 | 1 | 1 | 1 | 1 | 1 | 1 | 1 | 2 | — | 1 | 1 |
| | | | Degree of swelling in electrolysis solution [fold] | | 22 | 22 | 22 | 22 | 22 | 22 | 22 | 22 | 22 | 22 | 17 | — | 22 | 22 |
| | | | Glass-transition [°C] | | 90 | 90 | 90 | 90 | 90 | 90 | 90 | 90 | 90 | 90 | 39 | — | 90 | 90 |
| | | Shell | Composition | ST [mass %] | 19 | 19 | 19 | 19 | 18 | 19 | 19 | 19 | 19 | 19 | 19 | — | 19 | 19 |
| | | | | MAA [mass %] | 1 | 1 | 1 | 1 | 1 | 1 | 1 | 1 | 1 | 1 | 1 | — | 1 | 1 |
| | | | | AN [mass %] | — | — | — | — | — | — | — | — | — | — | — | — | — | — |
| | | | Degree of swelling in electrolysis solution | | 1.3 | 1.3 | 1.3 | 1.3 | 2.7 | 1.3 | 1.3 | 1.3 | 1.3 | 1.3 | 1.3 | — | 1.3 | 1.3 |
| | | | Glass-transition [°C] | | 103 | 103 | 103 | 103 | 105 | 103 | 103 | 103 | 103 | 103 | 103 | — | 103 | 103 |
| | | Core-shell ratio [%] | | | 13 | 13 | 13 | 13 | 13 | 13 | 13 | 13 | 13 | 13 | 13 | — | 13 | 13 |
| | | Ratio of coverage [%] | | | 65 | 65 | 65 | 65 | 65 | 65 | 65 | 65 | 65 | 65 | 65 | — | 65 | 65 |
| | | Volume-average particle diameter [μm] | | | 1.0 | 0.84 | 1.16 | 0.64 | 1.0 | 1.0 | 1.0 | 1.875 | 0.375 | 1.0 | 1.0 | — | 1.28 | 0.24 |
| | | Density [g/cm³] | | | 1.17 | 1.17 | 1.17 | 1.17 | 1.17 | 1.17 | 1.17 | 1.17 | 1.17 | 1.17 | 1.17 | — | 1.17 | 1.17 |
| | | Blending amount [parts by mass] | | | 6 | 6 | 6 | 6 | 6 | 10.5 | 3 | 6 | 6 | 6 | 6 | — | 6 | 6 |
| | Solid particles | Composition | ST [mass %] | | — | — | — | — | — | — | — | — | — | — | — | 95 | — | — |
| | | | MAA [mass %] | | — | — | — | — | — | — | — | — | — | — | — | 5 | — | — |
| | | Degree of swelling in electrolysis solution [fold] | | | — | — | — | — | — | — | — | — | — | — | — | 1.3 | — | — |
| | | Glass-transition temp. [°C] | | | — | — | — | — | — | — | — | — | — | — | — | 103 | — | — |
| | | Volume-average particle | | | — | — | — | — | — | — | — | — | — | — | — | 1.0 | — | — |

TABLE 1-continued

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 |
|---|---|---|---|---|---|---|---|---|---|---|---|---|---|---|---|
|  | diameter [μm] | — | — | — | — | — | — | — | — | — | — | — | 1.17 | — | — |
|  | Density [g/cm³] | — | — | — | — | — | — | — | — | — | — | — | 6 | — | — |
|  | Blending amount [parts by mass] | — | — | — | — | — | — | — | — | — | — | — |  | — | — |
|  | Volume-average particle diameter ratio (organic particles/non-conductive inorganic particles) [fold] | 1.25 | 1.05 | 1.45 | 0.80 | 1.25 | 1.25 | 1.25 | 1.25 | 1.25 | 1.25 | 1.25 | 1.25 | 1.60 | 0.30 |
|  | Density difference (non-conductive inorganic particles-organic particles) [g/cm³] | 3.33 | 3.33 | 3.33 | 3.33 | 3.33 | 3.33 | 3.33 | 3.33 | 3.33 | 3.33 | 3.33 | 3.33 | 3.33 | 3.33 |
| Particulate polymer | Volume-average particle diameter [nm] | 350 | 350 | 350 | 350 | 350 | 350 | 350 | 350 | 350 | 80 | 350 | 350 | 350 | 350 |
|  | Glass-transition temp. [° C.] | −40 | −40 | −40 | −40 | −40 | −40 | −40 | −40 | −40 | −40 | −40 | −40 | −40 | −40 |
|  | Blending amount [parts by mass] | 14 | 14 | 14 | 14 | 14 | 14 | 14 | 14 | 14 | 14 | 14 | 14 | 14 | 14 |
|  | Volume-average particle diameter ratio (particulate polymer/non-conductive inorganic particles) [fold] | 0.44 | 0.44 | 0.44 | 0.44 | 0.44 | 0.44 | 0.44 | 0.44 | 0.44 | 0.10 | 0.44 | 0.44 | 0.44 | 0.44 |
| Evaluations | Heat resistance | A | A | B | A | A | A | A | B | A | A | A | A | C | A |
|  | Blocking resistance | A | A | A | A | A | A | A | A | A | A | A | A | A | A |
|  | Adhesion to electrode | A | A | A | B | A | A | B | B | B | A | A | A | C | C |
|  | Low-temperature output characteristics | A | A | A | B | A | A | B | B | A | A | A | C | A | B |
|  | High-temperature cycle characteristics | A | A | A | A | A | A | A | B | B | A | A | B | C | C |

The results shown in Table 1 demonstrate that the functional layer compositions prepared in Examples 1-12, wherein organic particles having a specific property and non-conductive inorganic particles having a higher density than the organic particles by at least a specific amount are combined such that the ratio of the volume-average particle diameter of the organic particles to the volume-average particle diameter of the non-conductive inorganic particles falls within a specific range, may result in functional layers that can exert both protection function and adhesion function with a single layer configuration and that can provide firm adhesion between the electrode and separator in electrolysis solution while ensuring battery characteristics.

On the other hand, the results shown in Table 1 demonstrate that the functional layer compositions prepared in Comparative Examples 1 and 2, wherein the ratio of the volume-average particle diameter of the organic particles to the volume-average particle diameter of the non-conductive inorganic particles falls outside a specific range, failed to firmly bond together the electrode and separator in electrolysis solution while ensuring battery characteristics. The results of Table 1 also demonstrate that the functional layer composition prepared in Comparative Example 1, wherein the ratio of the volume-average particle diameter of the organic particles to the volume-average particle diameter of the non-conductive inorganic particles is too high, caused a reduction in the protection function of the functional layer and therefore a reduction in the heat shrinkage resistance of the separator.

Further, the results of Examples 1-4 and 7-9 shown in Table 1 demonstrate that adjustment of the blending amount of the organic particles, the volume-average particle diameter of the organic particles, the volume-average particle diameter of the non-conductive inorganic particles, and the ratio of the volume-average particle diameter of the organic particles to the volume-average particle diameter of the non-conductive inorganic particles may further improve adhesion in electrolysis solution of the functional layer, protection function of the functional layer, and battery characteristics.

Moreover, the results of Examples 1 and 12 shown in Table 1 demonstrate that the use of organic particles formed of core-shell particles may further improve battery characteristics.

INDUSTRIAL APPLICABILITY

According to this disclosure, it is possible to provide a composition for non-aqueous secondary battery functional layer which allows for production of a non-aqueous secondary battery functional layer that can exert protection function and adhesion function with a single layer configuration and that may provide firm adhesion between an electrode and a separator in electrolysis solution while ensuring battery characteristics.

According to this disclosure, it is also possible to provide a non-aqueous secondary battery functional layer that can exert both protection function and adhesion function with a single layer configuration and that can provide firm adhesion between an electrode and a separator in electrolysis solution while ensuring battery characteristics.

According to the present disclosure, it is also possible to provide a non-aqueous secondary battery that comprises the non-aqueous secondary battery functional layer, wherein the non-aqueous secondary battery exhibits superior battery characteristics and can be manufactured at high productivity.

The invention claimed is:

1. A composition for a non-aqueous secondary battery functional layer, comprising:
   non-conductive inorganic particles selected from a group consisting of particles of oxides, particles of nitrides, particles of covalent crystals, particles of hardly-soluble ionic crystals, microparticles of days, and a mixture thereof, and
   organic particles,
   wherein a difference in density between the non-conductive inorganic particles and the organic particles calculated by subtracting a density of the organic particles from a density of the non-conductive inorganic particles is 1.5 g/cm$^3$ or more,
   at least a surface layer portion of the organic particles is made of a first polymer containing an aromatic vinyl monomer unit and an acid group-containing monomer unit, the first polymer having a degree of swelling in electrolysis solution of greater than 1 time to 4 times and having a glass-transition temperature of 50° C. or above,
   the organic particles have a core-shell structure that comprises a core and a shell that partially covers an outer surface of the core, wherein the shell is made of the first polymer and the core is made of a second polymer containing a (meth)acrylic acid ester monomer unit, an acid group-containing monomer unit, and a cross-linkable monomer unit, the second polymer having a degree of swelling in electrolysis solution of 5 times to 30 times, and
   a volume-average particle diameter of the organic particles is 0.80 to LSO times a volume-average particle diameter of the non-conductive inorganic particles,
   wherein a blending ratio of the organic particles to the non-conductive inorganic particles is 1 part by mass to 20 parts by mass with respect to 100 parts by mass of the non-conductive inorganic particles,
   wherein the shell of the core-shell structure has an average thickness in percentage relative to the volume-average particle diameter of the organic particles of 1% or more and 30% or less,
   wherein the degree of swelling of the first polymer in electrolysis solution is determined by comparison of weights of a 1 cm×1 cm square sheet of the polymer having a thickness of 0.5 mm before and after immersing the square sheet in the electrolysis solution at 60° C. for 72 hours, and
   wherein the degree of swelling of the second polymer in electrolysis solution is determined by comparison of weights of a 1 cm×1 cm square sheet of the second polymer having a thickness of 0.5 mm before and after immersing the square sheet in the electrolysis solution at 60° C. for 72 hours.

2. The composition for a non-aqueous secondary battery functional layer of claim 1, wherein the volume-average particle diameter of the non-conductive inorganic particles is 0.1 μm to 2 μm.

3. The composition for a non-aqueous secondary battery functional layer of claim 1, wherein the volume-average particle diameter of the organic particles is 0.5 μm to 3 μm.

4. The composition for a non-aqueous secondary battery functional layer of claim 1, further comprising a particulate polymer having a glass-transition temperature of 20° C. or below.

5. The composition for a non-aqueous secondary battery functional layer of claim 4, wherein a volume-average particle diameter of the particulate polymer is 0.01 times to 0.60 times the volume-average particle diameter of the non-conductive inorganic particles.

6. A non-aqueous secondary battery functional layer formed using the composition for a non-aqueous secondary battery functional layer of claim 1.

7. A non-aqueous secondary battery comprising the non-aqueous secondary battery functional layer of claim 6.

\* \* \* \* \*